United States Patent
Suzuki et al.

(10) Patent No.: US 10,671,058 B2
(45) Date of Patent: Jun. 2, 2020

(54) MONITORING SERVER, DISTRIBUTED-PROCESSING DETERMINATION METHOD, AND NON-TRANSITORY COMPUTER-READABLE MEDIUM STORING PROGRAM

(71) Applicant: NEC Corporation, Minato-ku, Tokyo (JP)

(72) Inventors: Takaaki Suzuki, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 15/755,600

(22) PCT Filed: Sep. 2, 2016

(86) PCT No.: PCT/JP2016/004009
§ 371 (c)(1),
(2) Date: Feb. 27, 2018

(87) PCT Pub. No.: WO2017/038100
PCT Pub. Date: Mar. 9, 2017

(65) Prior Publication Data
US 2019/0025801 A1   Jan. 24, 2019

(30) Foreign Application Priority Data

Sep. 3, 2015 (JP) .................................. 2015-173811

(51) Int. Cl.
*G06T 1/20* (2006.01)
*G05B 19/418* (2006.01)
(Continued)

(52) U.S. Cl.
CPC ........ *G05B 19/4185* (2013.01); *B25J 13/006* (2013.01); *B25J 19/023* (2013.01);
(Continued)

(58) Field of Classification Search
CPC ... B25J 13/006; B25J 19/023; G05B 19/4183; G05B 19/4185; G06T 1/20;
(Continued)

(56) References Cited

U.S. PATENT DOCUMENTS

2009/0138544 A1* 5/2009 Wegenkittl ............ G06F 9/5083
709/203
2014/0139690 A1   5/2014 Tanaka et al.

FOREIGN PATENT DOCUMENTS

JP     2007-156541 A   6/2007
JP     2012-078950 A   4/2012
(Continued)

OTHER PUBLICATIONS

International Search Report for PCT Application No. PCT/JP2016/004009, dated Dec. 6, 2016.

*Primary Examiner* — Nirav G Patel

(57) ABSTRACT

A monitoring server includes a communication unit (11) that receives image data transmitted periodically from a robot (20), information on communication quality of a communication network between the monitoring server and the robot (20), and load information of the robot (20), and a distributed-processing control unit (12) that determines, based on at least one of tracking-operation-environment information of the tracking target (30) determined based on the image data, the information on the communication quality, and the load information, a process to be performed in the robot (20), and the process to be performed in the monitoring server itself from among an image analysis process including a plurality of processes, the image analysis process being a process of specifying the tracking target (30), in which the communication unit (11) transmits information on the process to be performed in the robot (20) to the robot (20).

17 Claims, 16 Drawing Sheets

(51) Int. Cl.
*G08B 13/196* (2006.01)
*G08B 25/04* (2006.01)
*G08B 25/10* (2006.01)
*G06T 7/246* (2017.01)
*B25J 13/00* (2006.01)
*B25J 19/02* (2006.01)

(52) U.S. Cl.
CPC ............ *G05B 19/4183* (2013.01); *G06T 1/20* (2013.01); *G06T 7/246* (2017.01); *G08B 13/196* (2013.01); *G08B 25/04* (2013.01); *G08B 25/10* (2013.01); *G06T 2200/16* (2013.01); *G06T 2207/10032* (2013.01)

(58) Field of Classification Search
CPC ....... G06T 2200/16; G06T 2207/10032; G06T 7/246; G08B 13/196; G08B 25/04; G08B 25/10
See application file for complete search history.

(56) References Cited

FOREIGN PATENT DOCUMENTS

| | | |
|---|---|---|
| JP | 2013-025668 A | 2/2013 |
| JP | 2014-102691 A | 6/2014 |

\* cited by examiner

Fig. 5

| PATTERN | COMMUNICATION NW STATUS | TRACKING-OPERATION ENVIRONMENT | LOAD STATUS | DETAILS OF DISTRIBUTION CONTROL |
|---|---|---|---|---|
| 1 | — | — | SMALL LOAD | PERFORM WHOLE IMAGE ANALYSIS IN ROBOT |
| 2 | SMALL DELAY | — | LARGE LOAD or INTERMEDIATE LOAD | PERFORM WHOLE IMAGE ANALYSIS IN MONITORING SERVER |
| 3 | INTERMEDIATE DELAY | ONLY TRACKING TARGET | INTERMEDIATE LOAD | PERFORM PRELIMINARY PROCESS AND/OR FEATURE-VALUE EXTRACTION PROCESS IN ROBOT |
| 4 | INTERMEDIATE DELAY | INCLUDING OBJECT OTHER THAN TRACKING TARGET | INTERMEDIATE LOAD | PERFORM COMPRESSION PROCESS (PRELIMINARY PROCESS) OF IMAGE DATA IN ROBOT |
| 5 | INTERMEDIATE DELAY | — | LARGE LOAD | OUTPUT ALERT |
| 6 | LARGE DELAY | — | LARGE LOAD or INTERMEDIATE LOAD | OUTPUT ALERT |

Fig. 8

| PATTERN | COMMUNICATION NW STATUS | TRACKING-OPERATION ENVIRONMENT | LOAD STATUS | DETAILS OF DISTRIBUTION CONTROL |
|---|---|---|---|---|
| 11 | — | — | SMALL LOAD | PERFORM WHOLE IMAGE ANALYSIS IN ROBOT |
| 12 | SMALL DELAY | — | LARGE LOAD | PERFORM WHOLE IMAGE ANALYSIS IN MONITORING SERVER |
| 13 | SMALL DELAY or INTERMEDIATE DELAY | ONLY TRACKING TARGET | INTERMEDIATE LOAD | PERFORM PRELIMINARY PROCESS AND/OR FEATURE-VALUE EXTRACTION PROCESS IN ROBOT |
| 14 | SMALL DELAY or INTERMEDIATE DELAY | INCLUDING OBJECT OTHER THAN TRACKING TARGET | INTERMEDIATE LOAD | PERFORM COMPRESSION PROCESS (PRELIMINARY PROCESS) OF IMAGE DATA IN ROBOT |
| 15 | INTERMEDIATE DELAY | — | LARGE LOAD | OUTPUT ALERT |
| 16 | LARGE DELAY | — | LARGE LOAD or INTERMEDIATE LOAD | OUTPUT ALERT |

Fig. 11

| PATTERN | COMMUNICATION NW STATUS | TRACKING-OPERATION ENVIRONMENT | LOAD STATUS | DETAILS OF DISTRIBUTION CONTROL |
|---|---|---|---|---|
| 21 | INTERMEDIATE DELAY | LOW-SPEED MOVEMENT | INTERMEDIATE LOAD | PERFORM WHOLE IMAGE ANALYSIS IN MONITORING SERVER WITH FREQUENCY OF K TIMES EVERY X TIMES |
| 22 | INTERMEDIATE DELAY | HIGH-SPEED MOVEMENT | INTERMEDIATE LOAD | PERFORM PRELIMINARY PROCESS AND/OR FEATURE-VALUE EXTRACTION PROCESS IN ROBOT |

Fig. 13

| PATTERN | COMMUNICATION NW STATUS | SHOOTING STATE | LOAD STATUS | DETAILS OF DISTRIBUTION CONTROL |
|---|---|---|---|---|
| 31 | — | — | SMALL LOAD | PERFORM WHOLE IMAGE ANALYSIS IN DEVICE |
| 32 | SMALL DELAY | — | LARGE LOAD or INTERMEDIATE LOAD | PERFORM WHOLE IMAGE ANALYSIS IN MONITORING SERVER |
| 33 | INTERMEDIATE DELAY | TARGET OBJECT IS DISPLAYED IN PART OF AREA | INTERMEDIATE LOAD | PERFORM TRIMMING (PRELIMINARY PROCESS) AND/OR FEATURE-VALUE EXTRACTION PROCESS IN DEVICE |
| 34 | INTERMEDIATE DELAY | TARGET OBJECT IS DISPLAYED IN LARGE SIZE | INTERMEDIATE LOAD | PERFORM COMPRESSION PROCESS (PRELIMINARY PROCESS) OF IMAGE DATA AND/OR FEATURE-VALUE EXTRACTION PROCESS IN DEVICE |
| 35 | INTERMEDIATE DELAY | ONLY TARGET OBJECT IS DISPLAYED | INTERMEDIATE LOAD | PERFORM CONVERSION INTO GRAY-SCALE, BANALIZATION, EDGE DETECTION (PRELIMINARY PROCESS) OF IMAGE DATA AND/OR FEATURE-VALUE EXTRACTION PROCESS IN DEVICE |
| 36 | INTERMEDIATE DELAY | — | LARGE LOAD | OUTPUT ALERT |
| 37 | LARGE DELAY | — | LARGE LOAD or INTERMEDIATE LOAD | OUTPUT ALERT |

Fig. 14

| PATTERN | COMMUNICATION NW STATUS | SHOOTING STATE | LOAD STATUS | DETAILS OF DISTRIBUTION CONTROL |
|---|---|---|---|---|
| 41 | — | — | SMALL LOAD | PERFORM WHOLE IMAGE ANALYSIS IN DEVICE |
| 42 | SMALL DELAY | — | LARGE LOAD | PERFORM WHOLE IMAGE ANALYSIS IN MONITORING SERVER |
| 43 | SMALL DELAY or INTERMEDIATE DELAY | TARGET OBJECT IS DISPLAYED IN PART OF AREA | INTERMEDIATE LOAD | PERFORM TRIMMING (PRELIMINARY PROCESS) AND/OR FEATURE-VALUE EXTRACTION PROCESS IN DEVICE |
| 44 | SMALL DELAY or INTERMEDIATE DELAY | TARGET OBJECT IS DISPLAYED IN LARGE SIZE | INTERMEDIATE LOAD | PERFORM COMPRESSION PROCESS(PRELIMINARY PROCESS) OF IMAGE DATA AND/ORFEATURE-VALUE EXTRACTION PROCESS IN DEVICE |
| 45 | SMALL DELAY or INTERMEDIATE DELAY | ONLY TARGET OBJECT IS DISPLAYED | INTERMEDIATE LOAD | PERFORM CONVERSION INTO GRAY-SCALE, BANALIZATION, EDGE DETECTION (PRELIMINARY PROCESS) OF IMAGE DATA AND/OR FEATURE-VALUE EXTRACTION PROCESS IN DEVICE |
| 46 | INTERMEDIATE DELAY | — | LARGE LOAD | OUTPUT ALERT |
| 47 | LARGE DELAY | — | LARGE LOAD or INTERMEDIATE LOAD | OUTPUT ALERT |

MONITORING SERVER, DISTRIBUTED-PROCESSING DETERMINATION METHOD, AND NON-TRANSITORY COMPUTER-READABLE MEDIUM STORING PROGRAM

This application is a National Stage Entry of PCT/JP2016/004009 filed on Sep. 2, 2016, which claims priority from Japanese Patent Application 2015-173811 filed on Sep. 3, 2015, the contents of all of which are incorporated herein by reference, in their entirety.

TECHNICAL FIELD

The present disclosure relates to a monitoring server, a distributed-processing determination method, and a program. In particular, the present disclosure relates to a monitoring server, a distributed-processing determination method, and a program for distribution control of an image analysis process.

BACKGROUND ART

In recent years, in connection with an increase in concern for security in daily life, surveillance has been augmented by use of surveillance cameras at various sites. For example, a system that enables tracking of a suspicious person by use of a small robot equipped with a camera has been studied. In order for the small robot to track the suspicious person, images photographed by the small robot need to be subjected to an analysis process. Generally, in order to meet demands regarding the small robot, such as that it consume less electric power and be downsized, an idea of performing analysis of the images in, for example, a server apparatus, and causing the small robot to perform a tracking operation based on results of the image analysis performed in, for example, the server apparatus has been proposed.

Patent Literature 1 discloses that, in consideration of, for example, processing performances and processing conditions of image processing apparatuses connected to a network, and a load on the network, image processes are distributed among the plurality of image processing apparatus. Specifically, Patent Literature 1 discloses that a task of recognizing a human face is processed in a distributed manner by a plurality of surveillance cameras, and that a task of distinguishing genders based on the recognized faces and calculating the numbers of persons in images by gender is processed in a distributed manner by the plurality of surveillance cameras.

CITATION LIST

Patent Literature

Patent Literature 1: Japanese Unexamined Patent Application Publication No. 2014-102691

SUMMARY OF INVENTION

Technical Problem

However, the distributed processes described in Patent Literature 1 are processes distributed among the plurality of surveillance cameras, and there is no description of processes distributed between apparatuses with different processing capabilities, such as between a small robot and a server apparatus.

As for the apparatuses with the different processing capabilities, even when processes having the same contents are distributed to those different apparatus, the small robot with a lower processing capability may not be able to perform the same processes as those to be performed in the server apparatus. In such cases, there is a problem that an excessive load is imposed on the small robot, or the distributed processes cannot be performed therein.

Further, in a real-time augmented reality (AR) service that uses a small-sized device, real-time image processes are required. Thus, in this AR service, when the image processes are distributed between the small-sized device and the server apparatus, there are problems similar to those that occur in the small robot, i.e., problems such as an excessive load is imposed on the small-sized device or the distributed processes cannot be performed therein.

An object of the present disclosure is to provide a monitoring server, a distributed-processing determination method, and a program that enable distributed processes to be performed even between apparatus with different processing capabilities.

Solution to Problem

A monitoring server according to a first aspect of the present disclosure includes a communication unit configured to receive image data acquired by an information processing apparatus; and a distributed-processing control unit configured to determine, based on a type of required output of an image analysis process for the image data, a process to be performed in the information processing apparatus and a process to be performed in the monitoring server itself from among the image analysis process.

A distributed-processing determination method according to a second aspect of the present disclosure includes receiving image data acquired by an information processing apparatus; and determining, based on a type of required output of an image analysis process for the image data, a process to be performed in the information processing apparatus and a process to be performed in an own apparatus from among the image analysis process.

A program according to a third aspect of the present disclosure causes a computer to perform: receiving image data acquired by an information processing apparatus; and determining, based on a type of required output of an image analysis process for the image data, a process to be performed in the information processing apparatus and a process to be performed in an own apparatus from among the image analysis process.

According to the present disclosure, it is possible to provide a monitoring server, a distributed-processing determination method that enables distributed processes to be performed even between apparatus with different processing capabilities.

BRIEF DESCRIPTION OF DRAWINGS

FIG. 5 is a table for explaining details of distribution control according to the second embodiment;

FIG. 8 is a table for explaining details of distribution control according to a third embodiment;

FIG. 11 is a table for explaining details of distribution control according to a fourth embodiment;

FIG. 13 is a table for explaining details of distribution control according to the fifth embodiment;

FIG. 14 is a table for explaining details of distribution control according to the fifth embodiment;

DESCRIPTION OF EMBODIMENTS

First Embodiment

Figure 1:
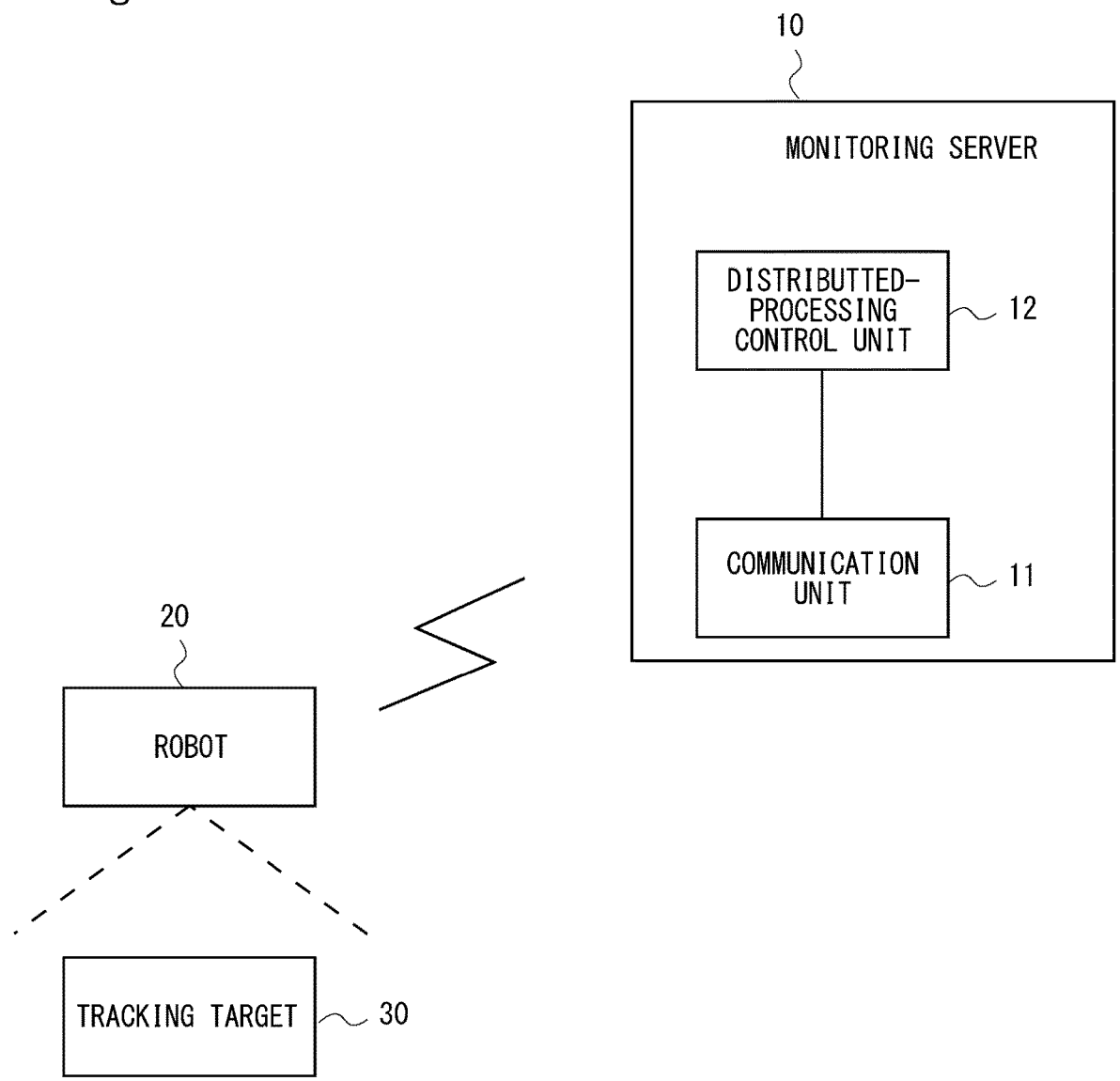
FIG. 1 is a configuration diagram of a communication system according to a first embodiment.

Embodiments according to the present disclosure are described hereinafter with reference to the drawings. First, with reference to FIG. 1, a configuration example of a communication system according to a first embodiment of the present disclosure is described. The communication system shown in FIG. 1 includes a monitoring server 10, a robot 20, and a tracking target 30.

The robot 20 may be a computer apparatus or an information processing apparatus that operates by having a processor execute a program stored in a memory. The robot 20 pursues the tracking target 30, for example, by moving on the ground or flying. The tracking target 30 may be a moving person or a moving object other than a human. Examples of the moving object may include transportation means such as an automobile, a bicycle, and a train. Alternatively, the tracking target 30 may be an animal other than a human. In another alternative, the tracking target 30 need not necessarily be a moving body, and may instead be a target place or a target object located inside or outside of a building such as a bridge, an office building, a house, and a factory, in a solar-photovoltaic power generator, a wind turbine, a forest, a river, a mountain (including a volcano), a plain, an ocean, or in a field or at a site of a natural disaster. In such cases, the target place or the target object may be changed at any time. Further, in such cases, a moving speed, a moving distance, a moving direction, and the like of the tracking target 30, which are described later, indicate relative movements of the target place or the target object with respect to movements of the robot 20 itself.

The monitoring server 10 may be a computer apparatus that operates by having a processor execute a program stored in a memory. Specifically, the monitoring server 10 may be, for example, a computer apparatus that is installed in radio base stations in a mobile network (3G network or long term evolution (LTE) network) that implements a wireless communication scheme according to 3GPP (3rd generation partnership project). The computer apparatus that is installed in the radio base stations in the mobile network may be an MEC (Mobile Edge Computing) server. Alternatively, the monitoring server 10 may be a computer apparatus that is installed in radio base stations (such as wireless access points, base units, network coordinators, and readers) in WiFi (wireless LAN communication), ZigBee (or, IEEE 802.15.4) communication, Bluetooth (trademark) communication, communication in RFID frequency bands, communication in specific power-saving radio frequency bands, or communication in other dedicated frequency bands. For example, in the case of the wireless LAN, the monitoring server 10 may be a computer apparatus that is installed, for example, in a broadband router or a wireless LAN access point. In the case of the ZigBee communication, the monitoring server 10 may be a computer apparatus that is installed, for example, in a ZigBee coordinator that coordinates a ZigBee PAN (Private Area Network). In the case of the communication in the specific power-saving radio frequency bands for radio control, the monitoring server 10 may be a computer apparatus that is installed in a ground station, i.e., an operation apparatus. Further, each of these computers may be an apparatus called a home gateway, an M2M gateway, an IoT (Internet of Things) gateway, an HEMS (Home Energy Management Server) server, or a ground station. In another alternative, the monitoring server 10 may be a computer apparatus that is installed, for example, in a data center, an office, a factory, and a home that are located on other ends of private lines or the Internet with respect to the robot 20. Each of such computer apparatuses installed at the other ends of the Internet may be a cloud server. A configuration example of the monitoring server 10 is described hereinafter.

The monitoring server 10 includes a communication unit 11 and a distributed-processing control unit 12. The components of the monitoring server 10 may be, for example, software or modules by which processes are performed by having a processor execute a program stored in a memory. Alternatively, the components of the monitoring server 10 may be hardware such as a circuit or a chip.

The communication unit 11 receives image data transmitted periodically from the robot 20 that pursues the tracking target 30, communication-quality information of a communication network between the monitoring server 10 and the robot 20, and load information of the robot 20. The image data refers to data that is generated when the robot 20 photographs the tracking target 30. For example, the robot 20 may periodically transmit the image data to the monitoring server 10 at intervals of several milliseconds, several tens of milliseconds, or several hundreds of milliseconds. Alternatively, the robot 20 may periodically transmit unprocessed image data obtained by photographing the tracking target 30 to the monitoring server 10. In another alternative, for example, data of resolution-reduced images, data of trimmed images, or data of gray-scaled images or binarized images may be transmitted to the monitoring server 10.

The communication unit 11 communicates with the robot 20 via the communication network. For example, the communication unit 11 may connect to the communication network by wired communication such as optical communication, or may connect to the communication network by wireless communication.

The unprocessed image data may be, for example, image data that is generated by photographing the tracking target 30 and has not yet been subjected to an image analysis process at all, which will be described later in detail. In other words, the unprocessed image data may be RAW image data that is acquired by photographing the tracking target with a camera and remains unchanged, or may be BMP image data that has not yet been subjected to information compression.

The communication-quality information may be a delay time related to data transmitted/received between the monitoring server 10 and the robot 20 via the communication network. The robot 20 may connect to the communication network by performing wireless communication. Further, the wireless communication may be, for example, mobile communication in which the wireless communication scheme according to the 3GPP (3rd Generation Partnership Project) is implemented, or may be mobile communication in which wireless communication schemes specified by other standardization organizations are implemented. The wireless communication scheme according to the 3GPP may be, for example, the LTE (Long Term Evolution). Alternatively, the wireless communication may be the wireless LAN communication, the ZigBee (or, IEEE 802.15.4) communication, the Bluetooth communication, the communication in the RFID frequency bands, the communication in the specific power-saving radio frequency bands, or the communication in the other dedicated frequency bands.

Further, the communication-quality information may be throughput of the data transmitted/received between the monitoring server 10 and the robot 20 via the communication network. Alternatively, the communication-quality information may be a communication bandwidth calculated, for example, from the throughput. In another alternative, the communication-quality information may be, for example, a signal strength of a radio signal transmitted from the robot 20, or a signal strength of a radio signal measured by the monitoring server 10. In yet another alternative, the communication-quality information may be estimated by various estimation methods or various analysis methods (such as Bayesian inference, Kalman filtering, particle filtering, a linear prediction method, a least-squares method, statistical analyses, or simple use of immediately previous values) by using information such as delays, throughput, bandwidths, or signal strengths in the past data communication and the like.

The load information of the robot 20 may be, for example, a processor usage ratio, a memory usage ratio, or a buffer usage ratio of the robot 20. Alternatively, the load information of the robot 20 may be, for example, a processor usage ratio, a memory usage ratio, and a buffer usage ratio that are required in each process in the image analysis process, which will be described later in detail, and a sum of those usage ratios that are required in these processes. In another alternative, the load information of the robot 20 may be, for example, a calculation processing time required for each process in the image analysis process, and a sum of the calculation processing times required for these processes. Note that, the calculation processing time may be obtained from a calculation processing time of each process required in an analysis process on image data used in the past by the various estimation methods or the various analysis methods (such as the Bayesian inference, the Kalman filtering, the particle filtering, the linear prediction method, the least-squares method, the statistical analyses, or simple use of immediately previous values).

Based on at least one of the communication-quality information, the load information, and tracking-operation-environment information of the tracking target 30, which is determined based on the image data transmitted from the robot 20, the distributed-processing control unit 12 determines, from among the plurality of processes included in the image analysis process, processes to be performed in the robot and processes to be performed in the monitoring server 10. Note that the tracking-operation-environment information of the tracking target 30 may be determined not only based on the image data transmitted from the robot 20 but also based on various other built-in sensors (such as an acceleration sensor, a gyroscopic sensor, a magnetic sensor, an ultrasonic sensor, a millimeter-wave sensor, an illuminance sensor, a barometric sensor, and a temperature/humidity sensor. The image analysis process refers to a process that is performed for specifying the tracking target 30.

The tracking-operation-environment information may be, for example, information on whether or not the image data contains an object or a different type of an obstacle other than the tracking target 30, or information on, for example, the movement direction and the movement speed of the tracking target 30, information on a distance between the tracking target 30 and the robot 20, information on a moving environment (such as a direction of wind, a wind pressure, an atmospheric pressure, conditions of a road surface (such as bumpy or smooth), and whether or not the tracking target 30 is in a backlit state where it faces a light source such as the sun), information on a moving speed and a moving direction of the robot 20 itself, and information on kinetic conditions obtained based, for example, on kinematics. For example, when the image data contains an object or a different type of an object other than the tracking target 30, the distributed-processing control unit 12 needs to specify the tracking target 30 from among the plurality of objects, (specifically, to specify, for example, a person wearing red clothes). Further, when the image data contains only the tracking target 30, it is only necessary to specify a type of the tracking target 30 (specifically, to specify, for example, a type of a person). Specifying a type means specifying types of, for example, humans, animals, or other objects. In other words, the distributed-processing control unit 12 may determine, based on the tracking-operation-environment information or the like, a type of output of the image analysis process (as in the above-described example, determine whether to output a position of the specific tracking target among a plurality of objects in the image analysis process, or whether to specify a type of the tracking target and output a position of the specified tracking target) that meets a request from an image analysis application (for example, in the case of a tracking application executed by the robot, a request to continue pursuing the tracking target), and may determine, according to the determined type of the output from the image analysis process, the processes to be performed in the robot 20 and the processes to be performed in the monitoring server 10. Further, to put it another way, the distributed-processing control unit 12 may change the image data to be used in accordance with information output in the image analysis process, in other words, in accordance with the target to be specified. For example, when the tracking target 30 needs to be specified, the distributed-processing control unit 12 may use clear image data (such as unprocessed image data, and image data from which at least color information or pattern information can be acquired as described later). When only the type of the tracking target 30 needs to be specified, the distributed-processing control unit 12 may use image data containing a small amount of information (such as image data obtained after performing a preliminary process described later). In other words, the distributed-processing control unit 12 may determine the processes to be performed in the robot 20 and the processes to be performed in the monitoring server 10 in accordance with the information output in the image analysis process.

The image analysis process may include, for example, a preliminary process, a feature-value extraction process, an object recognition process, and a specific-object recognition process. The preliminary process may be a process of performing at least one of, for example, compression of the image data (such as simple changes in resolution, and conversions to compressed images such as JPEG images, PNG images, and GIF images), grayscale conversion, binarization, edge detection (such as Sobel filtering, Laplacian filtering, and Canny method), trimming (cutting out parts of images), luminance correction, brightness correction, chroma correction, and noise removal (such as moving-average filtering and median filtering).

In the feature-value extraction process, feature values may be extracted by extraction of color information from a specific region, HOG (Histograms of Oriented Gradients), a SIFT (Scale Invariant Feature Transform), a SURF (Speeded Up Robust Features), an AKAZE (Accelerated-KAZE), a Shapelet, an EOH (Edge of Oriented Histograms), a Haar-like, and so on.

The object recognition process may be a process for detecting an object in image data. For example, in the object recognition process, a person in image data may be detected from a result of a search of a pattern classification database (a dictionary or a classifier) that is created based on feature values obtained by the HOG, or by learning with pattern recognition models such as SVMs (Support Vector Machines). Note that the pattern classification database may be created by learning with use of neural networks, a linear discriminant analysis (LDA), or AdaBoost (Adaptive Boosting). Alternatively, the pattern classification database may be created by preparing templates.

The specific-object recognition process may be a process for detecting the tracking target 30, i.e., the tracking target in the image data. For example, when a plurality of persons are detected in the image data, the specific-object recognition process may be a process for detecting a specific tracking target 30 based, for example, on color information of the tracking target 30, pattern information of, for example, clothes thereof, or face information thereof. These information items to be used for detecting the specific tracking target 30, such as the color information, the pattern information of, for example, clothes, and the face information may be obtained, for example, from the above-described feature-value extraction process.

The communication unit 11 transmits the information of the processes, which have been determined to be performed in the robot by the distributed-processing control unit 12, to the robot 20.

As described above, with use of the monitoring server 10 of FIG. 1, the plurality of processes to be performed in the image analysis process can be distributed into the processes to be performed in the robot and the processes to be performed in the monitoring server 10. Further, by determining contents of distributed processes by using, for example, the tracking-operation-environment information, the communication-quality information, and the load information, the monitoring server 10 can select the processes that can be performed in the robot 20. By doing so, different processes in the image analysis process can be performed in a distributed manner in the robot 20 and the monitoring server 10.

Second Embodiment

Figure 2:
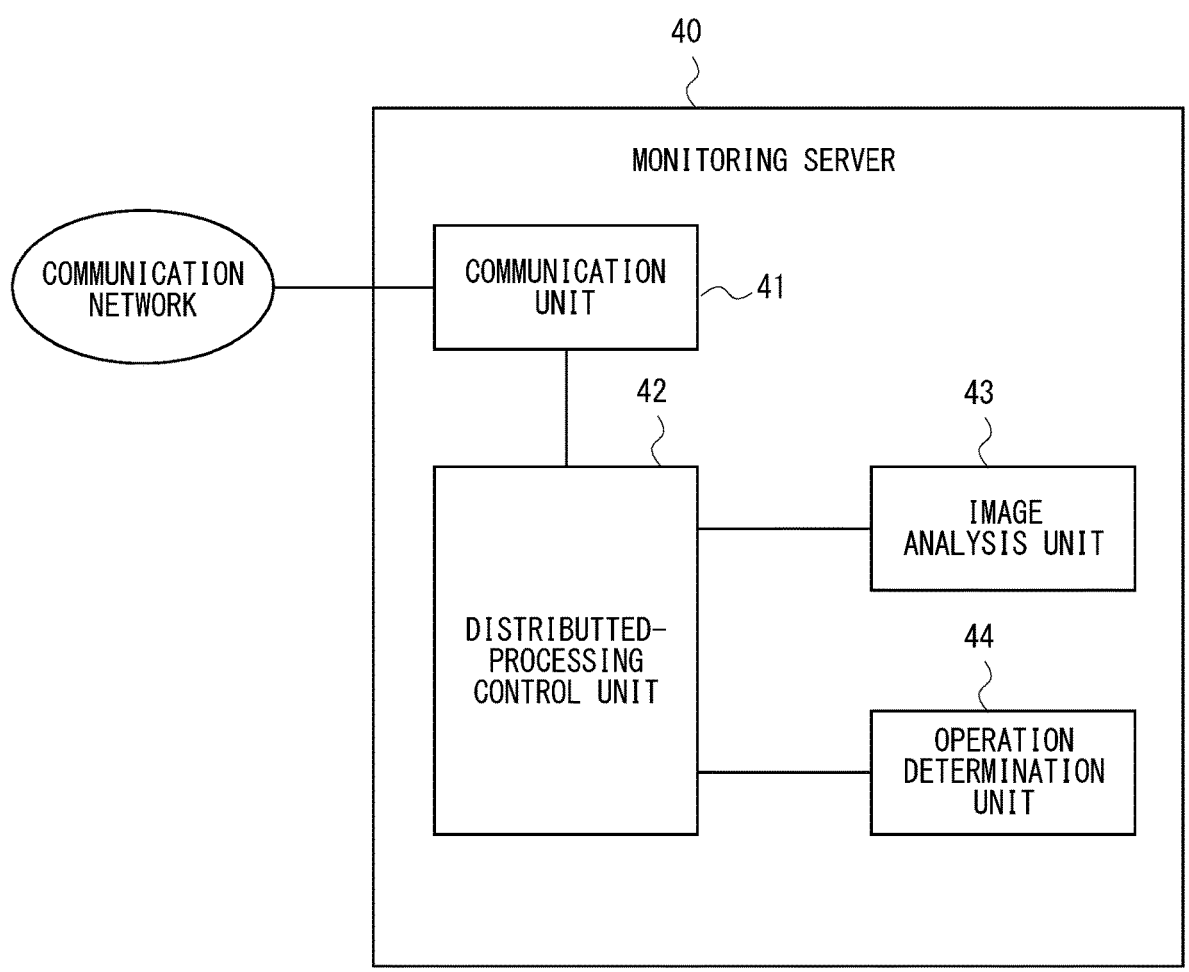
FIG. 2 is a configuration diagram of a monitoring server according to a second embodiment.

Next, a configuration example of a monitoring server 40 according to a second embodiment of the present disclosure is explained with reference to FIG. 2. The monitoring server 40 includes a communication unit 41, a distributed-processing control unit 42, an image analysis unit 43, and an operation determination unit 44. The communication unit 41 corresponds to the communication unit 11 shown in FIG. 1. The distributed-processing control unit 42 corresponds to the distributed-processing control unit 12 shown in FIG. 1.

Firstly, an outline of operations performed by the monitoring server 40 is explained.

The monitoring server 40 is used to control a tracking operation performed by a robot 50, which is described later. The tracking operation of the robot 50 is controlled by repeating processes that are performed through a series of control loops. The control loop includes, for example, an image acquisition process, an image analysis process, and an operation determination process.

The image acquisition process is a process in which the robot 50 photographs a tracking target 30 and thereby generates image data. The image analysis process is a process for specifying the tracking target 30 by using the image data. The operation determination process is a process for determining operations for tracking the tracking target 30. The robot 50 pursues the tracking target 30 in accordance with the operations determined in the operation determination process.

In order to enable the robot 50 to continuously perform the tracking operation for the tracking target 30, the control loop needs to be completed in a predetermined time. It should be noted that in the case where the image analysis process and the operation determination process are performed in the monitoring server 40, the control loop includes a transmission delay that is caused when the robot 50 transmits image data to the monitoring server 40 and a transmission delay that is caused when the monitoring server 40 transmits information about operations to the robot 50. The predetermined time, in which the control loop needs to be completed, may be referred to as, for example, a requested delay, a necessary period, or the like.

The monitoring server 40 performs distribution control for distributing processes between the robot 50 and the monitoring server 40 so that the requested delay is satisfied. In the following explanation, an example in which the monitoring server 40 performs distribution control for an image analysis process including a plurality of processes is explained. Each of components constituting the monitoring server 40 is explained hereinafter. Regarding the communication unit 41 and the distributed-processing control unit 42, explanations of some of their functions and operations that are same as those of the communication unit 11 and the distributed-processing control unit 12 shown in FIG. 1 are omitted.

The image analysis unit 43 performs a process that the distributed-processing control unit 42 determines as a process to be performed by the monitoring server 40. For example, the image analysis unit 43 may performs all the processes related to the image analysis process including a preliminary process, a feature-value extraction process, an object recognition process, and a specific-object recognition process, or may perform some of them. As some of the processes, the image analysis unit 43 may perform, for example, only the specific-object recognition process and the object recognition process. Alternatively, the image analysis unit 43 may perform, for example, only the feature-value extraction process, the object recognition process, and the specific-object recognition process. Further, the image analysis unit 43 may perform, for example, only the specific-object recognition process. Examples of the aforementioned some of the processes are not limited to the above-shown examples.

The operation determination unit 44 determines a tracking operation performed in the robot 50. For example, the operation determination unit 44 may determine a moving direction, a moving speed, and the like of the robot 50 by using a result of the image analysis process performed by the image analysis unit 43. The operation determination unit 44 outputs information about the determined tracking operation to the distributed-processing control unit 42. Note that an apparatus through which a person or the like operates the robot 50 (such as a controller for a radio-controlled vehicle (also called a proportional system) or a controller used with a smartphone) may be used in place of the operation determination unit 44. In such a case, an operator determines the moving speed, the moving distance, the moving direction, and the like of the robot 50. Further, in such a case, the image analysis unit 43 or other functional units (not shown) may display image information obtained from the robot 50 in a monitor (not shown). The monitor may be one that is used to enable the operator to recognize the moving state/moving environment of the robot 50, and the position and the state of the tracking target 30.

The distributed-processing control unit 42 transmits information about processes to be performed in the robot 20 to the robot 20 through the communication unit 41. Further, the distributed-processing control unit 42 transmits the information about the tracking operation of the robot 20 output from the operation determination unit 44 to the robot 20 through the communication unit 41.

A process for determining a tracking operation performed by the operation determination unit 44 is explained hereinafter in detail. Firstly, the operation determination unit 44 specifies the position of the tracking target 30 specified by the image analysis process performed by the image analysis unit 43 in the image data. For example, the operation determination unit 44 calculates an inter-pixel distance between a predetermined reference point in the image data and the position of the tracking target 30. Further, the operation determination unit 44 determines a moving speed, a moving distance, a moving direction, and the like of the tracking target 30 by multiplying the calculated inter-pixel distance by a predetermined conversion coefficient. The conversion coefficient may be, for example, a speed coefficient, a distance coefficient, or the like.

The operation determination unit 44 determines a moving speed, a moving distance, a moving direction, and the like of the robot 50 in order to make the robot 50 pursue the tracking target 30, whose moving speed, moving distance, moving direction, and the like have been determined. Further, the operation determination unit 44 may bring the moving speed of the robot 50 closer to the determined moving speed by gradually accelerating or decelerating the robot in order to make the movement of the robot 50 smooth. To that end, the operation determination unit 44 may determine a time by which the robot 50 reaches the determined moving speed in addition to the moving speed itself. Alternatively, the operation determination unit 44 may define a maximum speed or a minimum speed in each control loop according to an acceleration/deceleration model and thereby restrict sudden acceleration/deceleration.

Figure 3:
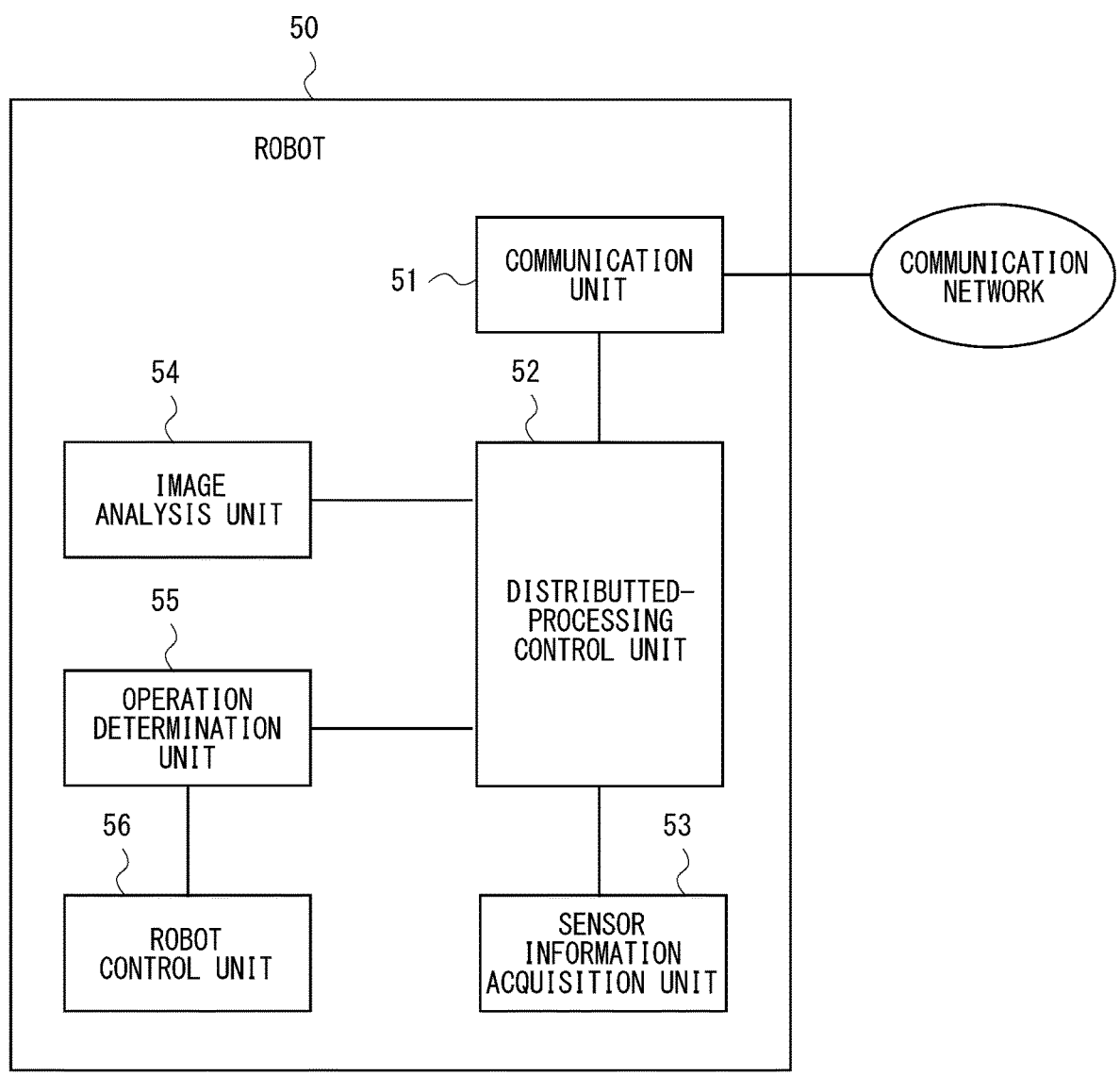
FIG. 3 is a configuration diagram of a robot according to the second embodiment.

Next, a configuration example of the robot 50 according to the second embodiment of the present disclosure is explained with reference to FIG. 3. The robot 50 includes a communication unit 51, a distributed-processing control unit 52, a sensor information acquisition unit 53, an image analysis unit 54, an operation determination unit 55, and a robot control unit 56. The components of the robot 50 may software, modules, or the like by which processes are performed by having a processor execute a program stored in a memory. Alternatively, the components of the robot 50 may be hardware such as a circuit or a chip.

The communication unit 51 connects to a communication network by performing wireless communication therewith.

The sensor information acquisition unit 53 may acquire, for example, image data obtained by photographing the tracking target 30 as sensor information. Alternatively, the sensor information acquisition unit 53 may acquire, for example, sensor data obtained by an acceleration sensor, a gyroscopic sensor, a magnetic sensor, an ultrasonic sensor, a millimeter-wave radar sensor, an illuminance sensor, a barometric sensor, or a temperature/humidity sensor as sensor information. The sensor information acquisition unit 53 outputs the acquired sensor information such as image data to the distributed-processing control unit 52.

The distributed-processing control unit 52 receives an instruction message about processes to be performed in the robot 50 transmitted from the monitoring server 40 through the communication unit 51. For example, the distributed-processing control unit 52 may receive a message for instructing to perform a preliminary process, a message for instructing to perform the preliminary process and a feature-value extraction process, or a message for instructing to perform all the processes related to the image analysis process for the image data transmitted from the sensor information acquisition unit 53. The distributed-processing control unit 52 outputs information about the processes specified in the instruction message to the image analysis unit 54.

Further, the distributed-processing control unit 52 outputs information about the tracking operation of the robot 50 transmitted from the monitoring server 40 through the communication unit 51 to the operation determination unit 55.

The image analysis unit 54 performs processes related to the image analysis process according to the information about the processes output from the distributed-processing control unit 52. The image analysis unit 54 outputs a result of the processes to the distributed-processing control unit 52. The distributed-processing control unit 52 transmits the result of the processes to the monitoring server 40 through the communication unit 51. Note that the whole image analysis process necessary to determine the operation of the robot 50 (e.g., all the processes from the preliminary process to the specific-object recognition process, all the process from the preliminary process to the object recognition process, or the like) may be performed by the image analysis unit 54. In such a case, the distributed-processing control unit 52 outputs the result of the processes output from the image analysis unit 54 to the operation determination unit 55.

The operation determination unit 55 outputs the information about the tracking operation of the robot 50 output from the distributed-processing control unit 52 to the robot control unit 56. Specifically, the operation determination unit 55 outputs information about a moving speed, a moving distance, a moving direction, and the like of the robot 50 to the robot control unit 56. Note that similarly to the operation determination unit 44, the operation determination unit 55 may determine the moving direction, the moving speed, and the like of the robot 50 by using a result of the image analysis process performed by the image analysis unit 54. Details of the determining method are similar to those of the operation determination unit 44 and therefore their explanations are omitted.

The robot control unit 56 controls movements of motors or the like for actually operating the robot 50 by using the information about the tracking operation output from the operation determination unit 55. Further, the robot control unit 56 may control tires or wings (or propellers), and/or a direction of a rudder or the like for determining the moving direction of the robot 50.

Next, a control sequence for the robot according to the second embodiment of the present disclosure is explained with reference to FIG. 4. In the robot control sequence shown in FIG. 4, firstly, it is assumed that the robot 50 periodically transmits image data that is generated when the robot 50 photographs the tracking target 30 to the monitoring server 40 (S11 to S13). It is assumed that when image data is transmitted in the steps S11 to S13, the monitoring server 40 performs all the processes related to the image analysis process or, for example, processes other than the preliminary process or processes other than the preliminary process and the feature-value extraction process.

That is, the monitoring server 40 performs the image analysis process and the operation determination process, and thereby transmits information about the tracking operation (a robot operation instruction) to the robot 50 every time image data is transmitted in the steps S11 to S13. In the steps S11 to S13, the robot 50 may transmit, for example, unprocessed image data to the monitoring server 40.

Next, the robot 50 transmits load information indicating a load status in the robot 50 to the monitoring server 40 (S14). Further, the monitoring server 40 determines communication quality information indicating a status of a communication network between the robot 50 and the monitoring server 40 (S15).

Figure 4:
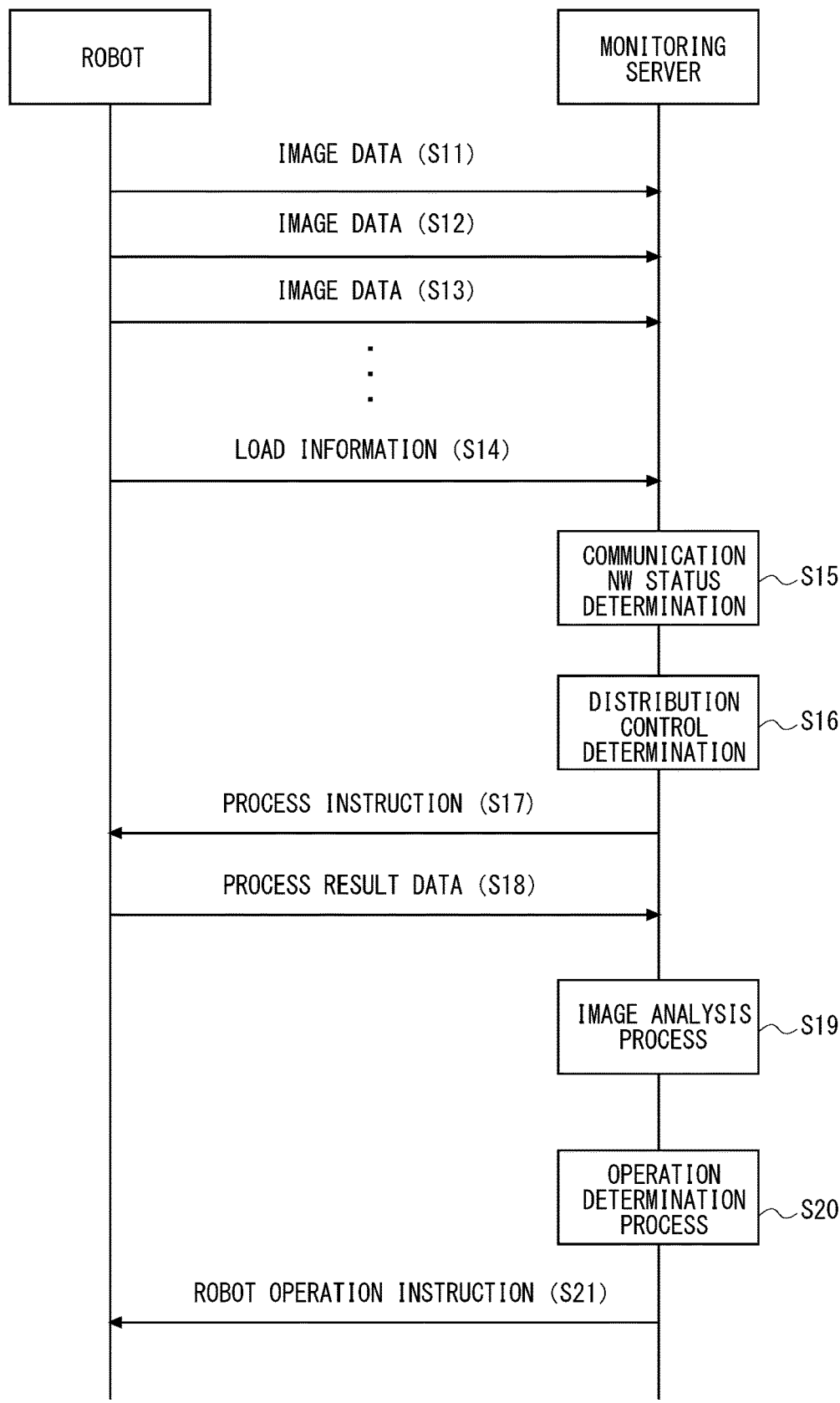
FIG. 4 is a sequence diagram for robot control according to the second embodiment.

In FIG. 4, an example in which the robot 50 transmits image data to the monitoring server 40 in the step S11 to S13 and then transmits load information to the monitoring server 40 in the step S14 is explained. However, the robot 50 may transmit the load information together with the image data to the monitoring server 40.

Next, the monitoring server 40 determines contents of the image analysis process that should be performed in the robot 50 and contents of the image analysis process that will be performed in the monitoring server 40 by using the image data, the load information, and the communication quality information transmitted from the robot 50 (S16). Note that the distribution control determination processes performed in the step S16 are described later in detail. The monitoring server 40 uses image data that is accumulated in the steps S11 to S13 as image data transmitted from the robot 50.

Next, the monitoring server 40 transmits a message indicating the processes that have been determined as the processes to be performed in the robot 50 to the robot 50 (S17). Next, the robot 50 performs the processes indicated by the instruction message transmitted in the step S17. The robot 50 transmits data on a result of the execution of the indicated processes to the monitoring server 40 (S18).

Next, in a step S16, the monitoring server 40 performs the image analysis processes that have been determined as the processes to be performed in the monitoring server 40 (S19). Next, the monitoring server 40 determines a tracking operation for the robot 50 to pursue a tracking target 30 specified as a result of the image analysis process (S20). Next, the monitoring server 40 transmits information on the determined tracking operation (a robot operation instruction) to the robot 50 (S21). Note that the processes in the steps S15 to S17 may be performed within a period in which the robot 50 transmits the image data (S11, S12 and S13) and the process result data (S18), or may be performed at an arbitrary time unrelated to the aforementioned period.

Details of the distribution control determined in the step S16 shown in FIG. 4 are explained hereinafter with reference to FIG. 5. FIG. 5 shows details of distribution control determined based on the communication network status, the tracking-operation-environment, and the load status. In FIG. 5, the distribution control is classified into patterns 1 to 6.

Regarding the communication network status, for example, a small delay, an intermediate delay, and a large delay are defined. For example, the small delay, the intermediate delay, and the large delay may be determined in such a manner that when a delay of data transmitted/received between the monitoring server 40 and the robot 50 is smaller than a threshold A, the delay is determined as a small delay, whereas when the delay is larger than a threshold B, the delay is determined as a large delay. Note that the threshold B is larger than the threshold A. Further, when a delay of data transmitted/received between the monitoring server 40 and the robot 50 is no smaller than the threshold A and no larger than the threshold B, the delay is determined as an intermediate delay. An example in which the communication network status is determined by using a delay time is explained above. However, instead of using the delay time, throughput, frequency band information, a signal strength of a radio signal transmitted from the robot 50, a signal strength of a radio signal measured in the monitoring server 40, or the like may be used. In such a case, in the case of the throughput, when the throughput is large, it indicates a small delay, whereas when the throughput is small, it indicates a large delay. Further, when the throughput is intermediate, it indicates an intermediate delay. Further, in the case of the frequency band information, when the frequency band is wide, it indicates a small delay, whereas when the frequency band is narrow, it indicates a large delay. Further, when the frequency band is intermediate, it indicates an intermediate delay. Further, in the case of the signal strength, when the signal strength is strong, it indicates a small delay, whereas when the signal strength is weak, it indicates a large delay. Further, when the signal strength is intermediate, it indicates an intermediate delay.

Regarding the tracking-operation-environment, it has been determined whether or not the tracking-operation-environment contains, in addition to the tracking target 30, a moving object or a type similar to or different from the tracking target 30 (e.g., in the case where the tracking target is a person, a moving object other than the human being such as a car), or an obstacle such as a wall. For example, the distributed-processing control unit 42 may accumulate unprocessed image data periodically transmitted from the robot 50 and determine whether or not the accumulated unprocessed image data contains a moving object other than the tracking target 30. Examples of the moving object include a person, an animal, and a vehicle such as a train and a car.

Regarding the load status, for example, a small load, an intermediate load, and a large load are defined. For example, when a usage ratio of a processor in the robot 50 is lower than a threshold C, it may indicate a small load, whereas when the usage ratio is higher than a threshold D, it may indicate a large load. Note that the threshold D is larger than the threshold C. Further, when the usage ratio of the processor in the robot 50 is no lower than the threshold C and no higher than the threshold D, it may indicate an intermediate load. An example in which the load status is determined by using a usage ratio of a processor is explained. However, instead of using the usage ratio of the processor, a usage ratio of a memory, a usage ratio of a buffer or the like may be used. Alternatively, a calculation process time required by each process in the image analysis process and a calculation process time required for each process may be used as the load status. That is, when a calculation process time taken for the image analysis process is short, it indicates a small load, whereas when the calculation process time is long, it indicates a large load. Further, when the calculation process time is intermediate, it indicates an intermediate load.

When the distributed-processing control unit 42 determines that the load status of the robot 50 is a small load, it determines that the whole image analysis process is performed in the robot 50 irrespective of the communication network status and the tracking-operation-environment (pattern 1). When the load status of the robot 50 is a small load, it is possible to eliminate the effect of the delay caused in data transmission between the monitoring server 40 and the robot 50 by performing the whole image analysis process in the robot 50.

When the communication network status is a small delay and the load status is a large load or an intermediate load, the distributed-processing control unit 42 determines that the whole image analysis process is performed in the monitoring server 40 irrespective of the tracking-operation-environment (pattern 2). That is, the robot 50 transmits unprocessed image data to the monitoring server 40. When the communication network status is a small delay, the delay between the monitoring server 40 and the robot 50 is small even when unprocessed image data having a large data size is transmitted. Therefore, when the load of the robot 50 is not the small load, the robot 50 transmits unprocessed image data to the monitoring server 40, so that the load on the robot 50 is reduced and the request delay for the control loop, which is performed to make the robot 50 perform the tracking operation, is satisfied.

When the communication network status and the load status are an intermediate delay and an intermediate load, respectively, and the tracking-operation-environment contains only the tracking target 30, the distributed-processing control unit 42 determines that the preliminary process and the feature-value extraction process are performed in the robot 50, or the preliminary process is performed in the robot 50 (pattern 3). If the robot 50 transmits unprocessed image data having a large data size when the communication network status is an intermediate delay, the delay increases. Therefore, there is a possibility that the delay could exceed the value of the requested delay, which is required to enable the robot 50 to perform high-speed operation control. Further, when the load status of the robot 50 is an intermediate load, the robot 50 is in a state in which it can perform a part of the image analysis process.

Further, regarding the tracking-operation-environment, when only the tracking target 30 is included in the image data, the monitoring server 40 can specify the tracking target 30 by using feature value data that is generated as a result of the feature-value extraction. This is because an object that is recognized based on the feature value data must be uniquely the tracking target 30.

Further, in the pattern 3, the robot 50 may perform up to the preliminary process without performing the feature-value extraction process and transmit result data of the performed process to the monitoring server 40. Specifically, for example, the robot 50 may perform trimming (cutting out a part of the image) for the tracking target 30 as the preliminary process and transmit the trimmed image data to the monitoring server 40. Since the data size of the trimmed image data is smaller than that of the unprocessed image data, it is possible to prevent an increase in the delay between the robot 50 and the monitoring server 40. Alternatively, for example, the robot 50 may perform compression, conversion into a gray-scale, banalization, edge detection, and/or the like for the image data as the preliminary process. The data size of the image data that is obtained after performing these processes is smaller than that of the unprocessed image data.

Therefore, the distributed-processing control unit 42 makes the robot 50 perform the preliminary process and the feature-value extraction process or perform the preliminary process and transmit feature-value extraction data or preliminary-processed image data having a data size smaller than that of the unprocessed image data (e.g., trimmed image data) to the monitoring server 40. By doing so, the distributed-processing control unit 42 satisfies the requested delay for the control loop, which is performed to make the robot 50 perform the tracking operation.

When the communication network status and the load status are an intermediate delay and an intermediate load, respectively, and the tracking-operation-environment contains a moving object (such as an object of a similar or different type or an obstacle) in addition to the tracking target 30, the distributed-processing control unit 42 determines that data compression of unprocessed image data (such as a resolution-reducing process, conversion into JPEG, conversion into PNG, and conversion into GIF) is performed in the robot 50 (pattern 4). If the robot 50 transmits unprocessed image data having a large data size when the communication network status is an intermediate delay, the delay increases. Therefore, there is a possibility that the delay could exceed the value of the requested delay, which is required to enable the robot 50 to perform high-speed operation control.

Further, regarding the tracking-operation-environment, when a moving object or the like other than the tracking target 30 is contained in the image data, the monitoring server 40 needs to specify the tracking target 30 from among a plurality of moving objects. However, the monitoring server 40 can recognize only a plurality of objects including the tracking target 30 even when it uses the feature value data transmitted from the robot 50 as in the case of the pattern 3, or uses gray-scaled data, binarized data, and edge-detected data. That is, it is very difficult for the monitoring server 40 to specify the tracking target 30 from among the plurality of objects. Alternatively, there is a possibility that the monitoring server 40 cannot recognize an object other than the tracking target because of the execution of the preliminary process such as trimming and hence the risk of a rear-end collision, a collision, and the like increase.

Therefore, the monitoring server 40 generates feature value data related to color information, face information, pattern information, or the like, in addition to the feature value data for detecting the object, in order to recognize the specific object, and thereby specifies the tracking target 30 from among the plurality of objects. The monitoring server 40 uses data-compressed image data (such as resolution-reduced image data) having a data size smaller than that of the unprocessed image data in order to generate the feature value data related to color information, face information, pattern information, or the like.

As a result, in the pattern 4, the distributed-processing control unit 42 makes the robot 50 transmit data-compressed image data (such as resolution-reduced image data). By doing so, the distributed-processing control unit 42 prevents the delay between the robot 50 and the monitoring server 40 from increasing and satisfies the requested delay for the control loop, which is performed to make the robot 50 perform the tracking operation. Further, the distributed-processing control unit 42 makes the monitoring server 40 generate feature value data related to color information, face information, pattern information, or the like. By doing so, the distributed-processing control unit 42 can prevent the load on the robot 50, which is the intermediate load, from increasing. Here, it is assumed that the load caused by the process for generating the feature value data related to color information, face information, pattern information, or the like is larger than the load caused by the process for data-compressing unprocessed image data (such as a resolution-reducing process) performed as the preliminary process.

When the load status of the robot 50 is a large load, the robot 50 can perform neither of the preliminary process and the feature-value extraction process included in the image analysis process. Further, when the communication network status is an intermediate delay, the robot 50 cannot transmit unprocessed image data, too. In such a situation, the distributed-processing control unit 42 outputs an alert that can be recognized by an administrator or the like (pattern 5). In the situation in which an alert is output, an ordinary message indicating details of control based on an image analysis result is not transmitted from the monitoring server 40 to the robot 50. Therefore, the robot 50 operates in accordance with an operation instruction for the robot instructed in the past. Specifically, for example, the robot 50 may perform an estimated operation by using an object position estimate by using a Kalman filter, a particle filter, or the like. Note that when the communication network status is an intermediate delay and the monitoring server 40 can transmit operation instruction information, the monitoring server may transmit the operation instruction information to the robot 50 together with the output of the alert.

Further, when the communication network status of the robot 50 is a large delay, it is substantially impossible to transmit data from the robot 50 to the monitoring server 40. Further, when the load status of the robot 50 is an intermediate load or a large load, it is impossible to perform all the processes related to the image analysis process in the robot 50. In such a situation, the distributed-processing control unit 42 outputs an alert that can be recognized by an administrator or the like (pattern 6). In the situation in which the alert is output, a message indicating details of control is not transmitted from the monitoring server 40 to the robot 50. Therefore, the robot 50 operates in accordance with an operation instruction for the robot instructed in the past.

Figure 6:
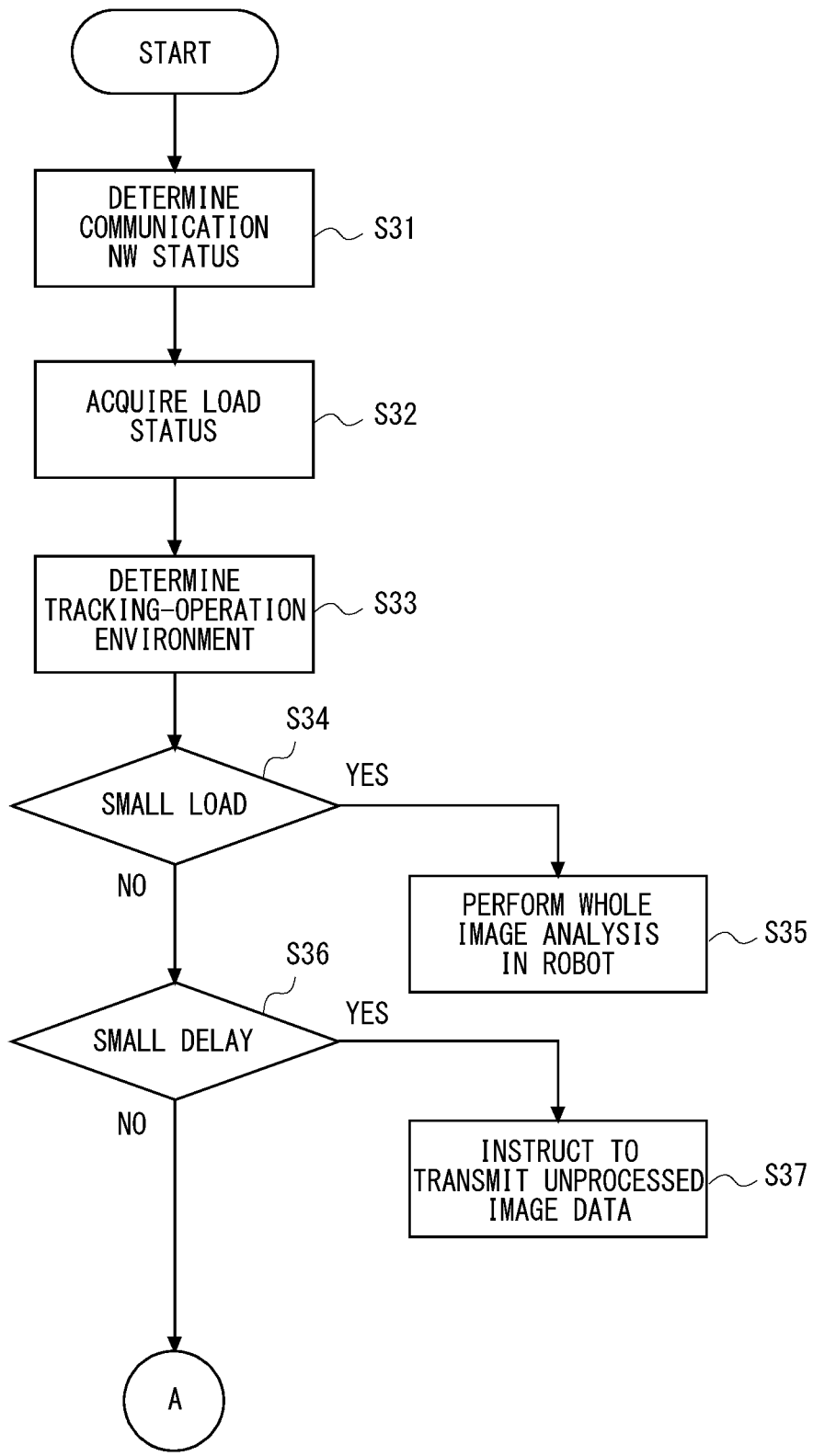
FIG. 6 shows a flow of a distribution control determination process according to the second embodiment.

Next, a flow of a distribution control determination process performed in the distributed-processing control unit 42 according to the second embodiment is explained with reference to FIGS. 6 and 7. In FIG. 6, it is assumed that the monitoring server 40 receives and accumulates unprocessed image data periodically transmitted from the robot 50.

Firstly, the distributed-processing control unit 42 determines a communication network status (S31). Specifically, the distributed-processing control unit 42 determines whether a delay caused in data transmission/reception between the monitoring server 40 and the robot 50 is a small delay, an intermediate delay, or a large delay. Alternatively, since the communication network status may be throughput, frequency band information, or information on a radio-wave signal strength as described previously, the distributed-processing control unit 42 may determine whether the delay is a small delay, an intermediate delay, or a large delay based on these information items.

Next, the distributed-processing control unit 42 acquires information about a load status of the robot 50 transmitted from the robot 50 (S32). For example, the distributed-processing control unit 42 may determine whether the load status of the robot 50 is a small load, an intermediate load, or a large load based on information on a usage ratio of a processor or the like transmitted from the robot 50. Alternatively, since the load status may be a calculation process time required by each process in the image analysis process and a calculation process time required for each process as described previously, the distributed-processing control unit 42 may determine whether the load status is a small load, an intermediate load, or a large load based on the length of the calculation process time.

Next, the distributed-processing control unit 42 determines a tracking-operation-environment by using unprocessed image data that were transmitted in the past and is accumulated therein, and/or sensor data obtained from various sensors (S33). For example, the distributed-processing control unit 42 determines whether or not a moving object other than the tracking target 30 is contained in the accumulated unprocessed image data.

The order of the processes in the steps S31 to S33 is not limited to the order shown in FIG. 6.

Next, the distributed-processing control unit 42 determines whether or not a load status of the robot 50 is a small load (S34). When the distributed-processing control unit 42 determines that the load status of the robot 50 is the small load, it determines that all the processes related to the image analysis process are performed by the robot 50 (S35). The determination in the step S35 corresponds to the pattern 1 in FIG. 5.

When the distributed-processing control unit 42 determines that the load status of the robot 50 is an intermediate load or a large load in the step S34, it determines whether or not a communication network status is a small delay (S36). When the distributed-processing control unit 42 determines that the communication network status is the small delay, it determines that all the processes related to the image analysis process are performed in the monitoring server 40. That is, the distributed-processing control unit 42 determines to make the robot 50 transmit the unprocessed image data (S37). The determination in the step S37 corresponds to the pattern 2 in FIG. 5.

Next, when the distributed-processing control unit 42 determines that the communication network status is an intermediate delay or a large delay in the step S36, it determines whether or not the communication network status is an intermediate delay and the load status of the robot 50 is an intermediate load (S38).

When the distributed-processing control unit 42 determines that the communication network status is not the intermediate delay or the load status of the robot 50 is not the intermediate load, it outputs an alert (S39). The state in which the communication network status is not the intermediate delay or the load status of the robot 50 is not the intermediate load means a state in which the communication network status is the intermediate delay and the load status of the robot 50 is a large load (pattern 5 in FIG. 5), a state in which the communication network status is a large delay and the load status of the robot 50 is the large load (pattern 6 in FIG. 5), or a state in which the communication network status is the large delay and the process load status of the robot 50 is the intermediate load (pattern 6 in FIG. 5).

Next, when the distributed-processing control unit 42 determines that the communication network status is the intermediate delay and the load status of the robot 50 is the intermediate load in the step S38, it determines whether or not the tracking-operation-environment contains only the tracking target 30 (S40).

When the distributed-processing control unit 42 determines that the tracking-operation-environment contains a moving object (such as an object of a similar or different type or an obstacle) in addition to the tracking target 30, it determines that the preliminary process, i.e., data compression of unprocessed image data (such as a resolution-reducing process) is performed in the robot 50 (S41). The determination in the step S41 corresponds to the pattern 4 in FIG. 5.

When the distributed-processing control unit 42 determines that the tracking-operation-environment contains only the tracking target 30, it determines that the preliminary process (compression, conversion into a gray-scale, banalization, edge detection, and/or the like of the image data) and the feature-value extraction process are performed in the robot 50, or the preliminary process is performed in the robot 50 (S42). The determination in the step S42 corresponds to the pattern 3 in FIG. 5.

As explained above, it is possible to distribute the image analysis process between the robot 50 and the monitoring server 40 by performing the distribution control according to the second embodiment of the present disclosure. Specifically, the distributed-processing control unit 42 can determine processes that should be performed in each of the apparatuses so that the requested delay required for performing high-speed operation control for the robot 50 is satisfied and excessive loads are prevented from being imposed on the robot 50.

Third Embodiment

Next, details of distribution control according to a third embodiment of the present disclosure are explained with reference to FIG. 8. In FIG. 8, distribution control is classified into patterns 11 to 16. The patterns 11, 15 and 16 are the same as the patterns 1, 5 and 6 shown in FIG. 5, and therefore their detailed explanations are omitted.

When the communication network status is a small delay and the load status is a large load, the distributed-processing control unit 42 determines that the whole image analysis process is performed in the monitoring server 40 irrespective of the tracking-operation-environment (pattern 12). That is, the robot 50 transmits unprocessed image data to the monitoring server 40. The difference between the pattern 12 and the pattern 2 shown in FIG. 5 is that the condition that the load status of the robot 50 is an intermediate load is eliminated from the pattern 2. When the load status of the robot 50 is the intermediate load, the robot 50 is in a state in which it can perform a part of the image analysis process. Therefore, the robot 50 is made to perform a part of the image analysis process even when the communication network status is the small delay. By having the robot 50 perform a part of the image analysis process, the size of data transmitted from the robot 50 to the monitoring server 40 is reduced. As a result, it is possible to reduce a communication band between the robot 50 and the monitoring server 40.

The part of the image analysis process that is performed in the robot 50 when the communication network status is the small delay and the load status is the intermediate load is shown in the patterns 13 and 14.

The pattern 13 includes an additional condition that the communication network status is a small delay, compared to the pattern 3 shown in FIG. 5. Further, the pattern 14 also includes an additional condition that the communication network status is the small delay, compared to the pattern 4 shown in FIG. 5.

Figure 9:
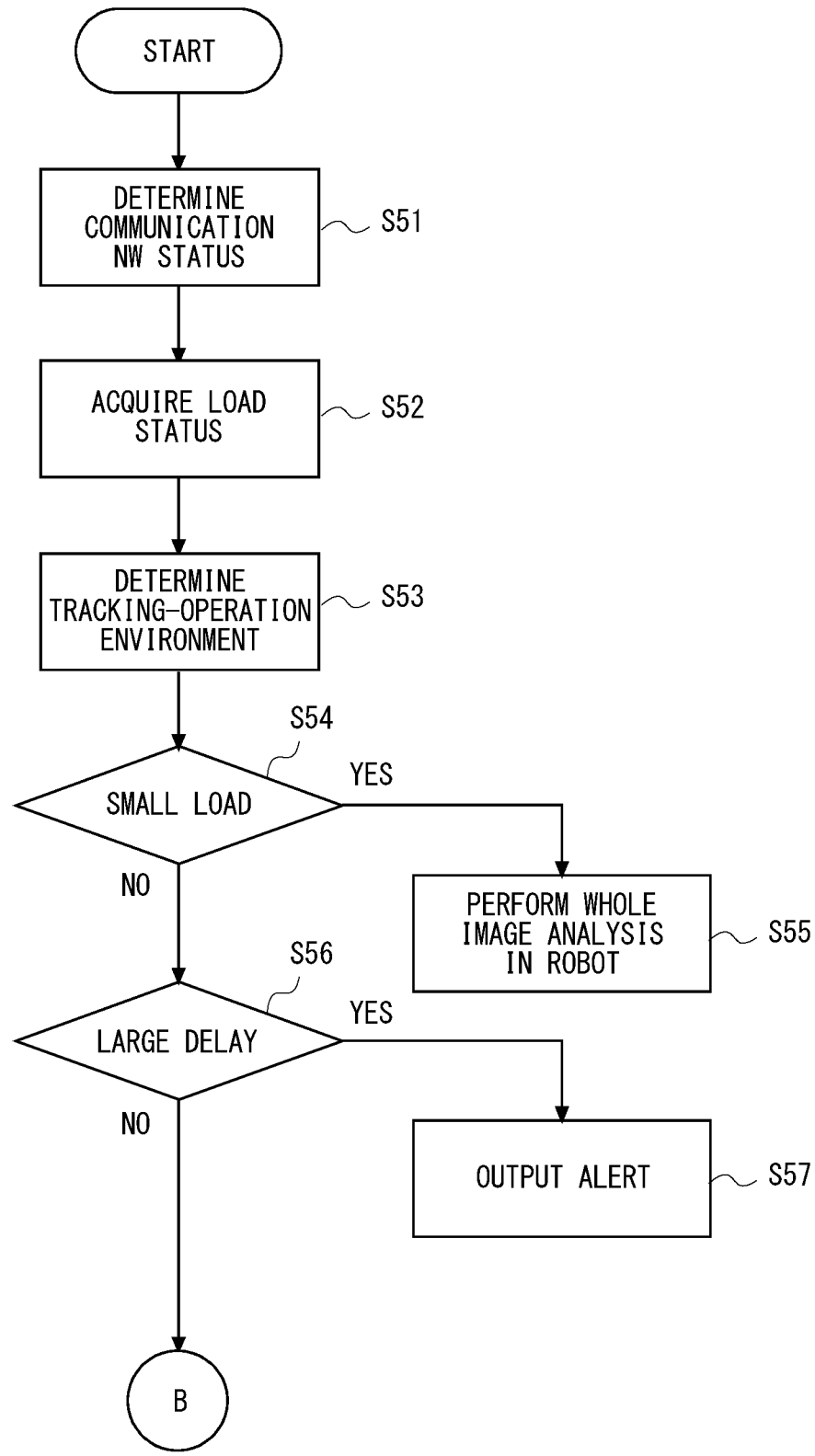
FIG. 9 shows a flow of a distribution control determination process according to the third embodiment.
Figure 10:
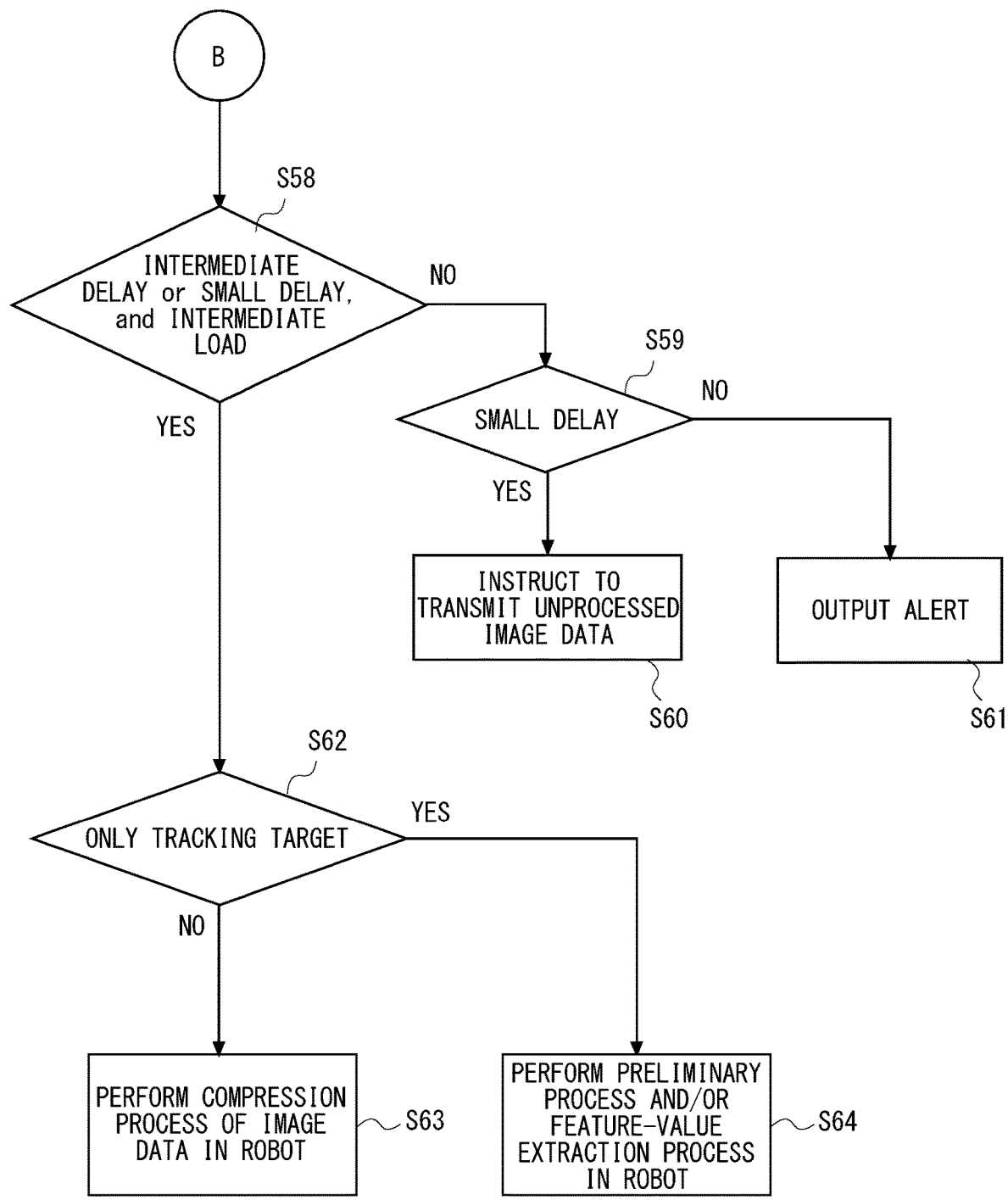
FIG. 10 shows a flow of a distribution control determination process according to the third embodiment.

Next, a flow of a distribution control determination process performed in the distributed-processing control unit 42 according to the third embodiment is explained with reference to FIGS. 9 and 10. In FIG. 9, it is assumed that the monitoring server 40 receives and accumulates unprocessed image data periodically transmitted from the robot 50. Steps S51 to S55 are similar to the steps S31 to S33 shown in FIG. 6 and hence their detailed explanations are omitted.

When the distributed-processing control unit 42 determines that the load status of the robot 50 is an intermediate load or a large load in the step S54, it determines whether or not a communication network status is a large delay (S56). When the distributed-processing control unit 42 determines that the communication network status is the large delay, it outputs an alert (S57). The determination in the step S57 corresponds to the pattern 16 in FIG. 8.

When the distributed-processing control unit 42 determines that the communication network status is the small delay or the intermediate delay in the step S56, it determines whether or not the communication network status is the small delay or the intermediate delay and the load status of the robot 50 is an intermediate load (S58).

When the distributed-processing control unit 42 determines that the communication network status is the small delay or the intermediate delay and the load status of the robot 50 is not the intermediate load, it determines whether or not the communication network status is the small delay (S59). In the step S58, the state in which the communication network status is the small delay or the intermediate delay and the load status of the robot 50 is not the intermediate load means a state in which the communication network status is the small delay or the intermediate delay and the load status of the robot 50 is a large load.

When the distributed-processing control unit 42 determines that the communication network status is the small delay in the step S59, it determines that all the processes related to image analysis process are performed in the monitoring server 40. That is, the distributed-processing control unit 42 determines to make the robot 50 transmit unprocessed image data (S60). The determination in the step S60 corresponds to the pattern 12 in FIG. 8.

When the distributed-processing control unit 42 determines that the communication network status is the intermediate delay in the step S59, it outputs an alert (S61). The determination in the step S61 corresponds to the pattern 15 in FIG. 8.

When the distributed-processing control unit 42 determines that the communication network status is the small delay or the intermediate delay and the load status of the robot 50 is the intermediate load in the step S58, it determines whether or not the tracking-operation-environment contains only the tracking target 30 (S62).

When the distributed-processing control unit 42 determines that the tracking-operation-environment contains a moving object (such as an object of a similar or different type or an obstacle) in addition to the tracking target 30, it determines that the preliminary process, i.e., data compression of unprocessed image data (such as a resolution-reducing process) is performed in the robot 50 (S63). The determination in the step S41 corresponds to the pattern 14 in FIG. 8.

When the distributed-processing control unit 42 determines that the tracking-operation-environment contains only the tracking target 30, it determines that the preliminary process (compression, conversion into a gray-scale, banalization, edge detection, and/or the like of the image data) and the feature-value extraction process are performed in the robot 50, or the preliminary process is performed in the robot 50 (S64). The determination in the step S64 corresponds to the pattern 13 in FIG. 8.

As explained above, in the third embodiment according to the present disclosure, it is possible to perform the distribution control determination process for the purpose of reducing the communication band between the robot 50 and the monitoring server 40.

The robot 50 periodically transmits image data, a result of a feature value extraction, or the like to the monitoring server 40 by performing radio communication. In radio communication, there is a possibility that the radio environment varies instantaneously. Therefore, even when the communication network status is a small delay, the radio environment could vary instantaneously and hence deteriorate instantaneously. Therefore, even when the communication network status is the small delay, if the load status of the robot 50 is an intermediate load and hence the robot 50 can afford an additional load, it is controlled so that the amount of data transmitted from the robot 50 is reduced. In this way, even when the radio communication environment varies, it is possible to perform operations so as to satisfy the requested delay. Further, even when the communication network status is a small delay, it is possible to reduce traffic of radio communication by proactively making the robot 50 perform the image analysis process and hence to improve the radio use efficiency. Consequently, it is possible to increase the number of robots that operate in a similar mechanism, reduce the usage fee for the communication, reduce the power consumption, and so on.

Fourth Embodiment

Next, details of distribution control according to a fourth embodiment of the present disclosure are explained with reference to FIG. 11. In FIG. 11, distribution control is classified into patterns 21 and 22.

In FIG. 11, it is defined whether the tracking target 30 is moving at a high speed or at a low speed in the tracking-operation-environment. Whether the tracking target 30 is moving at the high speed or at the low speed may be determined by using, for example, information about a moving speed of the tracking target 30 that was specified in a process for determining a tracking operation performed in the past. For example, the distributed-processing control unit 42 may determine that the tracking target 30 is moving at a high speed when the moving speed of the tracking target 30 is higher than a predetermined threshold, and determine that the tracking target 30 is moving at a low speed when the moving speed is lower than the threshold.

Further, the distributed-processing control unit 42 may determine that the tracking target 30 is moving at a high speed when the moving speed of the tracking target 30 specified in the tracking operation determination process is higher than the threshold n times in a row (n is an integer no less than two), and determine that the tracking target 30 is moving at a low speed when the moving speed is lower than the threshold n times in a row The moving speed of the tracking target 30 may be derived from the rate of changes in the position of the tracking target in images obtained in a plurality of control loops in the past. For example, the current moving speed may be estimated by deriving the moving speed from a difference between positions of the tracking target in images obtained in two latest control loops in the past. Alternatively, for example, the current moving speed may be estimated by using image data obtained in m control loops in the past. For the estimation, for example, a Kalman filter, a particle filter, or the like may be used. Alternatively, the moving speed of the tracking target 30 may be derived from values obtained by an acceleration sensor provided in the robot 50. Further, the moving speed of the tracking target 30 may be derived by using information on a distance to the object obtained by a millimeter-wave radar, an ultrasonic sensor, or the like in addition to the values of the acceleration sensor.

The patterns 21 and 22 are defined for cases where the communication network status is an intermediate delay and the load status of the robot 50 is an intermediate load. In the pattern 21, when it is determined that the tracking target 30 is moving at a low speed, the distributed-processing control unit 42 determines that the whole image analysis process is performed in the monitoring server 40 with a frequency of K times every X times ($1 \leq K < X$: X is an integer no less than two, and K is an integer no less than one and no greater than X). That is, the distributed-processing control unit 42 determines that unprocessed image data is transmitted from the robot 50 to the monitoring server 40 with the frequency of K times every X times. Each of the X times and the K times is the number of times the monitoring server 40 instructs the robot 50 about the tracking operation (i.e., the number of times of control loops).

When the tracking target 30 is moving at a low speed, it is possible to easily estimate the position to which the tracking target 30 will move after the movement. Therefore, it is possible to increase the requested delay for the control loop that is performed to track the tracking target 30. In other words, even when the requested delay for the control loop is increased, it is possible to successfully track the tracking target 30 because the tracking target 30 is moving at the low speed.

Therefore, when the tracking target 30 is moving at a low speed, the distributed-processing control unit 42 determines to make the robot 50 transmit unprocessed image data even when the communication status is an intermediate delay. Further, in the remaining (X−K) times of control loops in which the robot 50 does not transmit unprocessed image data, the robot 50 may operate in accordance with a tracking operation in the past (such as the above-described estimated operation that is performed in the case of an alert), or may stop its operation.

In the pattern 22, when it is determined that the tracking target 30 is moving at a high speed, the distributed-processing control unit 42 determines that the preliminary process and the feature-value extraction process are performed in the robot, or the preliminary process is performed in the robot.

When the tracking target 30 is moving at a high speed, it is impossible to easily estimate the position to which the tracking target 30 will move after the movement. Therefore, when the communication network status is an intermediate delay, the distributed-processing control unit 42 makes the robot 50 transmit preliminarily-processed data or feature value data having a data size smaller than that of the unprocessed image data in order to satisfy the requested delay for the control loop.

As explained above, the monitoring server 40 can perform the image analysis process by using unprocessed image data by performing the distribution control according to the fourth embodiment of the present disclosure even when the communication network status becomes an intermediate delay and hence the radio environment is deteriorating.

The monitoring server 40 can accurately determine details of the tracking operation by using unprocessed image data.

Further, in FIG. 11, the tracking-operation-environment is determined by using the moving speed of the tracking target 30. However, the tracking-operation-environment may be determined by using information such as a moving direction or a moving model (such as information whether the movement is a linear movement or a random waypoint movement) of the tracking target 30. For example, when the moving direction of the tracking target 30 is a linear direction, it is possible to easily estimate the position to which the tracking target 30 will move after the movement. Therefore, in this case, the distribution control in the pattern 21 may be performed. In contrast, when the moving direction of the tracking target 30 is uncertain, it is impossible to easily estimate the position to which the tracking target 30 will move after the movement. Therefore, in this case, the distribution control in the pattern 22 may be performed.

Fifth Embodiment

Next, distribution control for an image analysis process in a real-time AR service using a small-sized device is explained. The small-sized device used in the AR service may be an information processing device such as a smartphone and a wearable device. An AR service in which a head mount display (HMD: Head Mount Display) is used as the wearable device is explained hereinafter.

As an example of the AR service using an HMD, there is a service in which images for assisting a machine assembling work are displayed in an HMD. In such a case, assisting images for showing a procedure for assembling a machine as well as the machine to be assembled are displayed in the HMD. Specifically, when there is a step in which a screw is used when a machine is assembled, an assisting image showing a place where the screw is used may be displayed in the HMD. In such a case, an image for displaying text, symbols, or the like may be used as the assisting image. Note that the assisting image is also referred to as an AR image.

Further, in the first to fourth embodiments, examples in which a moving object is tracked are explained. In contrast, in the fifth embodiment, an example in which as a person wearing an HMD moves, the direction of the HMD is changed, and as a result, a position of a target object on the screen displayed in the HMD is changed is mainly explained. In other words, a case in which although a target object does not move, the position of the target object on the screen is changed as the direction of an HMD is changed is mainly explained. The object is, for example, a machine to be assembled or the like. It should be noted that in a case in which a wearer watches a sport game and additional information of a player (such as data on the player and records in the game), which is a target object in the sport game, is displayed as an AR image, when the player moves, the position of the target object on the screen changes even when the direction of the HMD is not changed. The fifth embodiment includes such cases in which the target object moves.

When the position of the target object on the screen displayed in the HMD is changed, the positions of the assisting image and the additional information of the object also need to be changed. Therefore, it is necessary to perform an image analysis process for specifying the positions of the target object and the AR image in real time.

Note that similar to the image analysis process explained in the first to fourth embodiments, the image analysis process in the AR service includes a preliminary process, a feature-value extraction process, an object recognition process, a specific-object recognition process, and the like. Further, an AR image specifying process and an AR image display position specifying process are performed as operation determination processes in the AR service.

The AR image specifying process is a process in which an AR image to be displayed is determined according to a result of the image analysis process. Further, the AR image display position specifying process is a process in which a position where an AR image is displayed is specified according to a change in the position of the target object.

Figure 12:
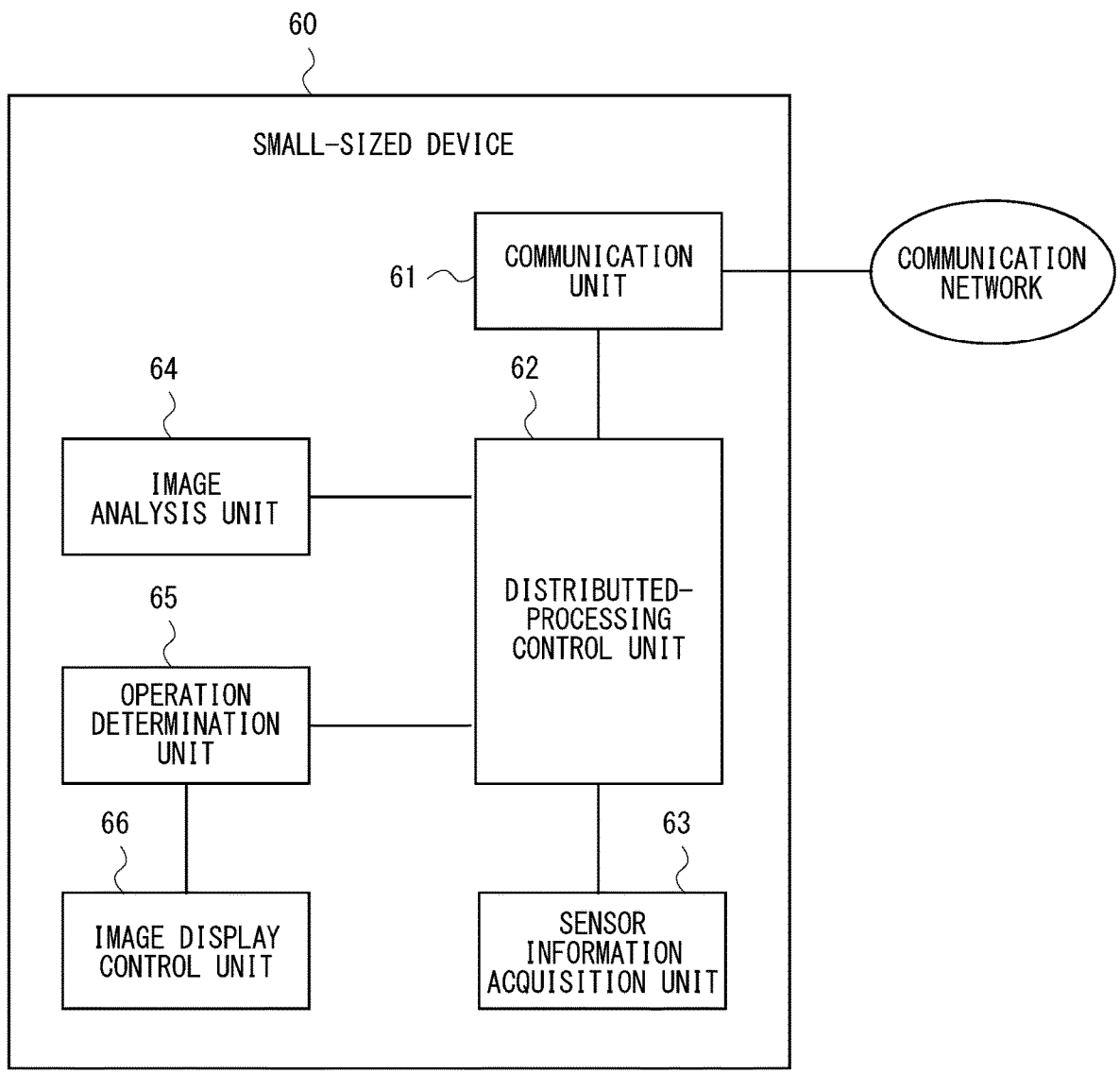
FIG. 12 is a configuration diagram of a small-sized device according to a fifth embodiment.

A configuration example of a small-sized device 60 such as an HMD is explained with reference to FIG. 12. Note that the configuration of the monitoring server is similar to that of the monitoring server 40 shown in FIG. 2 and therefore its detailed explanation is omitted.

The small-sized device 60 includes a communication unit 61, a distributed-processing control unit 62, a sensor information acquisition unit 63, an image analysis unit 64, an operation determination unit 65, and an image display control unit 66. Regarding the communication unit 61, the distributed-processing control unit 62, the sensor information acquisition unit 63, the image analysis unit 64, and the operation determination unit 65, detailed explanations of functions or operations similar to those of the robot 50 shown in FIG. 3 are omitted.

The operation determination unit 65 performs the AR image specifying process and the AR image display position specifying process. The operation determination unit 65 outputs an AR image that is determined to be displayed in the AR image specifying process and a position where an AR image will be displayed determined in the AR image display position specifying process to the image display control unit 66. The image display control unit 66 displays the AR image in a display unit (not shown) of the small-sized device 60 in accordance with the information output from the operation determination unit 65.

Details of distribution control between the small-sized device and the monitoring server is explained hereinafter with reference to FIG. 13. FIG. 13 shows details of distribution control that are determined based on a communication network status, a shooting state, and a load status. In FIG. 13, the distribution control is classified into patterns 31 to 37. The communication network status and the load status are similar to those shown in FIG. 5 and hence their detailed explanations are omitted.

Regarding the shooting state, display states of the target object in shot images taken by the small-sized device are defined. Specifically, a state in which the target object is displayed only in a part of the area of the shot image, a state in which the target object is displayed in a large size, and a state in which only the target object is displayed in the shot image are defined. The part of the area of the shot image may be defined in advance. Further, regarding the state in which the target object is displayed in the large size, for example, a state in which the ratio of the area in which the target object is displayed in the shot image exceeds a predetermined threshold corresponds to the state in which the target object is displayed in the large size.

The patterns 31 and 32 are similar to the patterns 1 and 2 shown in FIG. 5, except that the robot 50 in the patterns 1 and 2 in FIG. 5 is replaced by the small-sized device. Therefore, their detailed explanations are omitted. Further, the patterns 36 and 37 are similar to the patterns 5 and 6 shown in FIG. 5 and hence their detailed explanations are omitted.

The pattern 33 specifies that when the communication network status and the load status are an intermediate delay and an intermediate load, respectively, and the target object is displayed only in a part of the area in the shooting state, the preliminary process and the feature-value extraction process are performed, or the preliminary process is performed in the small-sized device. Further, in the pattern 33, instead of using the feature value data, the small-sized device may perform trimming for the target object and transmit the trimmed image data to the monitoring server. Since the data size of the trimmed image data is smaller than that of the unprocessed image data, it is possible to prevent an increase in the delay between the small-sized device and the monitoring server. Further, the area in which the target object is not displayed becomes an unnecessary area. Therefore, by performing trimming for the target object, it is possible to remove the unnecessary area and thereby reduce the data size.

The pattern 34 specifies that when the communication network status and the load status are an intermediate delay and an intermediate load, respectively, and the target object is displayed in a large size in the shooting state, data compression of unprocessed image data (such as a resolution-reducing process) is performed in the small-sized device. When the target object is displayed in a large size, the monitoring server can specify the target object even by using the image data that is obtained after performing data compression of unprocessed image data (such as a resolution-reducing process). Further, the pattern 34 may also specify that processes up to the feature-value extraction process are performed in the small-sized device.

The pattern 35 specifies that when the communication network status and the load status are an intermediate delay and an intermediate load, respectively, and only the target object is displayed in the shooting state, conversion into a gray-scale, banalization, and/or edge detection are performed for the unprocessed image data in the small-sized device. When only the target object is displayed, it is easy to specify the object even when the color information is eliminated. Therefore, conversion into a gray-scale and the like are performed for the unprocessed image data in order to reduce the data size. Further, the pattern 35 may also specify that processes up to the feature-value extraction process are performed in the small-sized device.

Figure 7:
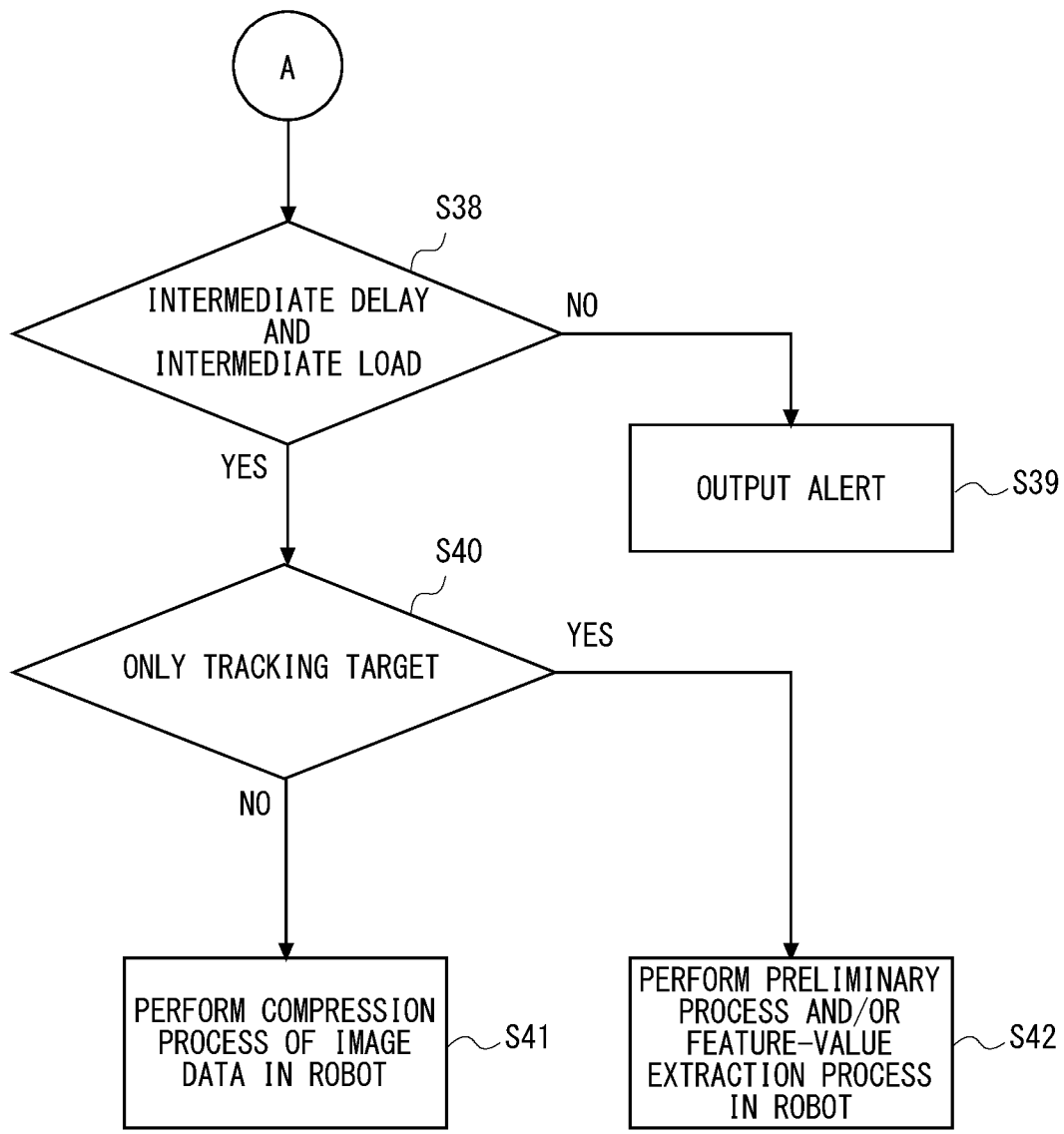
FIG. 7 shows a flow of a distribution control determination process according to the second embodiment.

Note that the distribution control determination process performed in the monitoring server is similar to that shown in FIGS. 6 and 7, except that the robot in FIGS. 6 and 7 is replaced by the small-sized device. Therefore, their detailed explanations are omitted. Further, in the AR service, the shooting state is determined and one of the patterns 33 and 35 is selected according to the determined shooting state in the step S40 in FIG. 7.

Next, details of distribution control different from the distribution control shown in FIG. 13 are explained with reference to FIG. 14. In FIG. 14, the distribution control is classified into patterns 41 to 47. The patterns 41, 46 and 47 are similar to the patterns 31, 36 and 37 shown in FIG. 13 and hence their detailed explanations are omitted.

The pattern 42 specifies that when the communication network status is a small delay and the load status is a large load, the whole image analysis process is performed in the monitoring server 40 irrespective of the shooting state. That is, the small-sized device 60 transmits unprocessed image data to the monitoring server 40. The difference between the pattern 42 and the pattern 32 in FIG. 13 is that the state in which the load status of the small-sized device 60 is an intermediate load is eliminated from the pattern 32. When the load status of the small-sized device 60 is the intermediate load, the small-sized device 60 is in a state in which it can perform a part of the image analysis process. Therefore, the small-sized device 60 is made to perform a part of the image analysis process even when the communication network status is the small delay. By having the small-sized device 60 perform a part of the image analysis process, the size of data transmitted from the small-sized device 60 to the monitoring server 40 is reduced. As a result, it is possible to reduce a communication band between the small-sized device 60 and the monitoring server 40.

The part of the image analysis process that is performed by the small-sized device 60 when the communication network status is a small delay or an intermediate delay and the load status is an intermediate load is shown in the patterns 43 and 45.

The pattern 43 includes an additional condition that the communication network status is a small delay, compared to the pattern 33 shown in FIG. 13. Further, each of the patterns 44 and 45 also includes an additional condition that the communication network status is the small delay, compared to the patterns 34 and 35, respectively, shown in FIG. 13.

As explained above, similarly to the first to fourth embodiments, it is also possible to distribute the image analysis process in the AR service between the small-sized device and the monitoring server. It is possible to distribute the image analysis process so as to satisfy the requested transmission delay in the AR service by distributing the image analysis process according to the load status of the small-sized device, the communication network status, and the shooting state.

Next, configuration examples of the monitoring servers 10 and 40, the robots 20 and 50, and the small-sized device 60 explained in the above-described plurality of embodiments are explained hereinafter.

Figure 15:
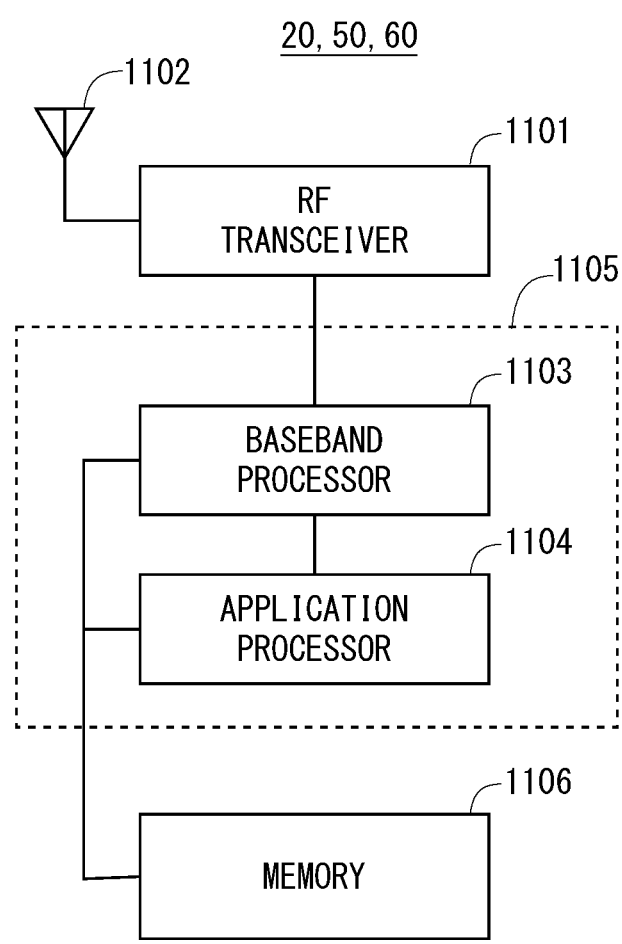
FIG. 15 is a configuration diagram of a robot or a small-sized device according to each embodiment.

FIG. 15 is a block diagram showing a configuration example of each of the robots 20 and 50, and the small-sized device 60. A Radio Frequency (RF) transceiver 1101 performs an analog RF signal process in order to communicate with the base station. The analog RF signal process performed by the RF transceiver 1101 includes a frequency up-conversion, a frequency down-conversion, and amplification. The RF transceiver 1101 is connected to an antenna 1102 and a baseband processor 1103. That is, the RF transceiver 1101 receives modulation symbol data (or OFDM symbol data) from the baseband processor 1103, generates a transmission RF signal, and supplies the generated transmission RF signal to the antenna 1102. Further, the RF transceiver 1101 generates a baseband reception signal based on a reception RF signal received through the antenna 1102 and supplies the generated baseband reception signal to the baseband processor 1103.

The baseband processor 1103 performs a digital baseband signal process for radio communication (a data-plane process) and a control-plane process. The digital baseband signal process includes (a) data compression/restoration, (b) data segmentation/concatenation, (c) transmission format (transmission frame) generation/decomposition, (d) transmission path encoding/decoding, (e) modulation (symbol mapping), (f) OFDM symbol data (baseband OFDM signal) generation by Inverse Fast Fourier Transform (IFFT), and so on. Meanwhile, the control-plane process includes communication management in a layer 1 (e.g., transmission power control), a layer 2 (e.g., radio resource management and a hybrid automatic repeat request (HARQ)), and a layer 3 (e.g., attach, mobility, and signaling related to telephone-call management).

For example, in the case of LTE or LTE-Advanced, the digital baseband signal process performed by the baseband processor 1103 may include signal processes in a Packet Data Convergence Protocol (PDCP) layer, a Radio Link Control (RLC) layer, a MAC layer, and a PHY layer. Further, the control-plane process performed by the baseband processor 1103 may include a Non-Access Stratum (NAS) protocol, an RRC protocol, and a MAC CE process.

The baseband processor 1103 may include a modem-processor (e.g., a Digital Signal Processor (DSP)) that performs a digital baseband signal process and a protocol-stack-processor (e.g., a Central Processing Unit (CPU), or a Micro Processing Unit (MPU)) that performs a control-plane process. In this case, the same processor may be used as both the aforementioned protocol-stack-processor that performs a control-plane process and a later-described application processor 1104.

The application processor 1104 is also referred to as a CPU, an MPU, a microprocessor, or a processor core. The application processor 1104 may include a plurality of processors (or a plurality of processor cores). The application processor 1104 implements various functions of each of the robots 20 and 50, and the small-sized device 60 by executing a system software program (Operating System (OS)) and various application programs (e.g., a telephone-call application, a WEB browser, a mailer, a camera operation application, and a music playback application) read from a memory 1106 or other memories (not shown).

In some implementations, the baseband processor 1103 and the application processor 1104 may be integrally disposed (or formed) on one semiconductor chip as indicated by broken lines (1105) in FIG. 15. In other words, the baseband processor 1103 and the application processor 1104 may be implemented as one System on Chip (SoC) device 1105. The SoC device may also be called a system LSI (Large Scale Integration) or a chip set.

The memory 1106 is a volatile memory, a nonvolatile memory, or a combination thereof. The memory 1106 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. For example, the memory 1106 may include an external memory device that can be accessed by the baseband processor 1103, the application processor 1104, and the SoC 1105. The memory 1106 may include an internal memory device integrally disposed (or formed) in the baseband processor 1103, the application processor 1104, or the SoC 1105. Further, the memory 1106 may include a memory disposed in a Universal Integrated Circuit Card (UICC).

The memory 1106 may store a software module (a computer program) including a group of instructions and data for performing processes performed by each of the robots 20 and 50, and the small-sized device 60 explained in the above-described plurality of embodiments. In some implementations, the baseband processor 1103 or the application processor 1104 may be configured so that it performs processes performed by the robots 20 and 50, and the small-sized device 60 explained in the above-described embodiments by reading the software module from the memory 1106 and executing the read software module.

Figure 16:
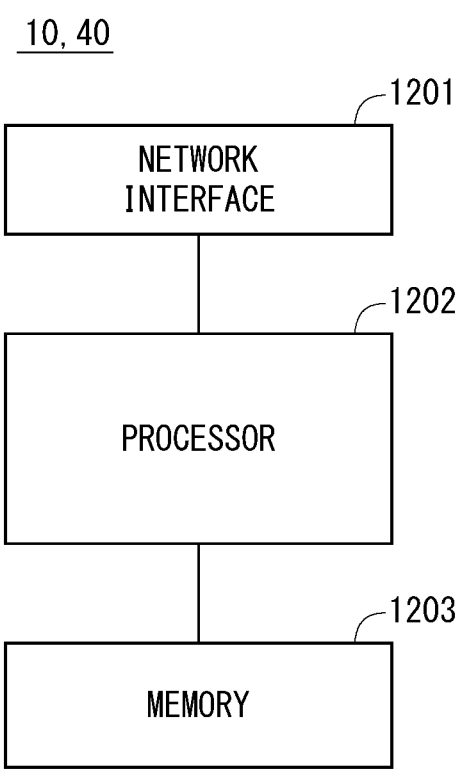
FIG. 16 is a configuration diagram of a monitoring server according to each embodiment.

FIG. 16 is a block diagram showing a configuration example of each of the monitoring servers 10 and 40. As shown in FIG. 16, each of the monitoring servers 10 and 40 includes a network interface 1201, a processor 1202, and a memory 1203. The network interface 1201 is used for communication with a network node (e.g., the eNodeB 130, the MME, the P-GW). The network interface 1201 may include, for example, a network interface card (NIC) in conformity with IEEE 802.3 series.

The processor 1202 performs processes performed by each of the monitoring servers 10 and 40 explained with reference to the sequence diagrams and the flowcharts in the above-described embodiments by reading a software module from the memory 1203 and executing the read software module. The processor 1202 may be, for example, a microprocessor, an MPU, or a CPU. The processor 1202 may include a plurality of processors.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 16, the memory 1203 is used to store a group of software modules. The processor 1202 can perform processes performed by each of the monitoring servers 10 and 40 explained in the above-described embodiments by reading the group of software modules from the memory 1203 and executing the read software modules.

As explained above with reference to FIGS. 15 and 16, each of the processors included in the monitoring servers 10 and 40, the robots 20 and 50, and the small-sized device 60 in the above-described embodiments executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure. For example, although distribution control for an image analysis process is mainly explained in the above-described embodiments, distribution control for an operation determination process may be implemented.

Although the present disclosure is explained above with reference to embodiments, the present disclosure is not limited to the above-described embodiments. Various modifications that can be understood by those skilled in the art can be made to the configuration and details of the present disclosure within the scope of the present disclosure.

This application is based upon and claims the benefit of priority from Japanese patent applications No. 2015-173811, filed on Sep. 3, 2015, the disclosure of which is incorporated herein in its entirety by reference.

The whole or part of the embodiments disclosed above can be described as, but not limited to, the following Supplementary notes.

(Supplementary Note 1)

A monitoring server comprising:

a communication unit configured to receive image data acquired by an information processing apparatus; and a distributed-processing control unit configured to determine, based on a type of required output of an image analysis process for the image data, a process to be performed in the information processing apparatus and a process to be performed in the monitoring server itself from among the image analysis process.

(Supplementary Note 2)

The monitoring server described in Supplementary note 1, wherein the distributed-processing control unit determines a content of the image analysis process based on the type of the output of the image analysis process.

(Supplementary Note 3)

The monitoring server described in Supplementary note 1 or 2, wherein the communication unit also receives at least one of information on communication quality of a communication network between the monitoring server and the information processing apparatus, and processing-load information of the information processing apparatus, and the distributed-processing control unit determines, based on at least one of the content of the image analysis process, the information on the communication quality, and the processing-load information, the process to be performed in the information processing apparatus, and the process to be performed in the monitoring server itself from among the information analysis process.

(Supplementary Note 4)

The monitoring server described in any one of Supplementary notes 1 to 3, wherein the distributed-processing control unit determines the type of the output of the image analysis process based on information on an execution status of an application based on the image data.

(Supplementary Note 5)

The monitoring server described in any one of Supplementary notes 1 to 4, wherein the communication unit receives image data transmitted periodically from a robot, information on communication quality of a communication network between the monitoring server and the robot, and processing-load information on the robot, the robot being the information processing apparatus configured to pursue a tracking target, the distributed-processing control unit determines, based on at least one of tracking-operation-environment information of the tracking target determined based on the image data, the information on the communication quality, and the processing-load information, a process to be performed in the robot, and the process to be performed in the monitoring server itself from among the image analysis process including a plurality of processes, the image analysis process being a process of specifying the tracking target, and the communication unit also transmits information on the process to be performed in the robot to the robot.

(Supplementary Note 6)

The monitoring server described in Supplementary note 5, wherein when a processing load on the robot is smaller than a predetermined first processing load, the distributed-processing control unit determines that all the processes included in the image analysis process are performed in the robot irrespective of the tracking-operation-environment information and the information on the communication quality.

(Supplementary Note 7)

The monitoring server described in Supplementary note 5 or 6, wherein when the processing load on the robot is larger than the predetermined first processing load and the communication quality is better than a predetermined first communication quality, the distributed-processing control unit determines that the robot transmits unprocessed image data and all the processes included in the image analysis process are performed in the monitoring server itself.

(Supplementary Note 8)

The monitoring server described in Supplementary note 7, wherein when the communication quality is poorer than the predetermined first communication quality and better than a second communication quality, and the first communication quality is better than the second communication quality, and when the processing load on the robot is larger than the predetermined first processing load and smaller than a second processing load, and the first processing load is smaller than the second processing load, the distributed-processing control unit determines whether the robot transmits image data obtained by compressing the unprocessed image data, or the robot performs a feature-value extraction process of extracting a feature value of the tracking target, the feature-value extraction process being included in the image analysis process.

(Supplementary Note 9)

The monitoring server described in Supplementary note 8, wherein when the tracking-operation-environment information does not contain a moving object other than the tracking target, the distributed-processing control unit determines that the robot performs the feature-value extraction process of extracting the feature value of the tracking target included in the image analysis process.

(Supplementary Note 10)

The monitoring server described in Supplementary note 8 or 9, wherein when the tracking-operation-environment information contains a moving object other than the tracking target, the distributed-processing control unit determines that the robot transmits the image data obtained by compressing the unprocessed image data.

(Supplementary Note 11)

The monitoring server described in Supplementary note 6, wherein when the processing load on the robot is larger than a predetermined second processing load and the second processing load is larger than the first processing load, and when the communication quality is better than a predetermined first communication quality, the distributed-processing control unit determines that the robot transmits unprocessed image data and all the processes included in the image analysis process are performed in the monitoring server itself.

(Supplementary Note 12)

The monitoring server described in Supplementary note 11, wherein when the communication quality is better than a second communication quality and the second communication quality is poorer than the first communication quality, and when the processing load on the robot is larger than the predetermined first processing load and smaller than the second processing load, and the first processing load is smaller than the second processing load, the distributed-processing control unit determines whether the robot transmits image data obtained by compressing the unprocessed image data, or the robot performs a feature-value extraction process of extracting a feature value of the tracking target, the feature-value extraction process being included in the image analysis process.

(Supplementary Note 13)

The monitoring server described in Supplementary note 12, wherein when the tracking-operation-environment information does not contain a moving object other than the tracking target, the distributed-processing control unit determines that the robot performs the feature-value extraction process of extracting the feature value of the tracking target included in the image analysis process.

(Supplementary Note 14)

The monitoring server described in Supplementary note 12 or 13, wherein when the tracking-operation-environment information contains a moving object other than the tracking target, the distributed-processing control unit determines that the robot transmits the image data obtained by compressing the unprocessed image data.

(Supplementary Note 15)

The monitoring server described in any one of Supplementary notes 5 to 14, wherein the image analysis process comprises a feature-value extraction process of extracting the feature value of the tracking target, an object recognition process of recognizing an object corresponding to the tracking target, and an object specifying process of specifying the tracking target.

(Supplementary Note 16)

A monitoring server comprising:

a communication unit configured to receive image data periodically transmitted from a robot, the robot configured to pursue a tracking target; and a distributed-processing control unit configured to determine, based on moving speed information of the tracking target determined based on the image data, a process to be performed in the robot and a process to be performed in the monitoring server itself from among an image analysis process including a plurality of processes, the image analysis process being a process of specifying the tracking target, wherein the communication unit transmits information on the process to be performed in the robot to the robot.

(Supplementary Note 17)

The monitoring server described in any one of Supplementary notes 1 to 4, wherein the communication unit receives image data transmitted periodically from a device, information on communication quality of a communication network between the monitoring server and the device, and processing-load information of the device, the device being the information processing apparatus configured to provide an AR service, the distributed-processing control unit determines, based on at least one of a shooting state of a target object determined based on the image data, the information on the communication quality, and the processing-load information, a process to be performed in the device, and the process to be performed in the monitoring server itself from among the image analysis process including a plurality of processes, the image analysis process being a process of specifying the target object, and the communication unit also transmits information on the process to be performed in the device to the device.

(Supplementary Note 18)

The monitoring server described in Supplementary note 17, wherein when a processing load on the device is smaller than a predetermined first processing load, the distributed-processing control unit determines that all the processes included in the image analysis process are performed in the device irrespective of the shooting state and the information on the communication quality.

(Supplementary Note 19)

The monitoring server described in Supplementary note 17 or 18, wherein when the processing load on the device is larger than the predetermined first processing load and the communication quality is better than a predetermined first communication quality, the distributed-processing control unit determines that the device transmits unprocessed image data and all the processes included in the image analysis process are performed in the monitoring server itself.

(Supplementary Note 20)

The monitoring server described in Supplementary note 19, wherein when the communication quality is poorer than the predetermined first communication quality and better than a second communication quality, and the first communication quality is better than the second communication quality, and when the processing load on the device is larger than the predetermined first processing load and smaller than a second processing load, and the first processing load is smaller than the second processing load, the distributed-processing control unit determines that the device performs at least one of a plurality of image processes.

(Supplementary Note 21)

The monitoring server described in Supplementary note 20, wherein when the target object is displayed only in a part of an area of the unprocessed image data in the shooting state, the distributed-processing control unit determines that the device performs a feature-value extraction process of extracting a feature value of the target object, or the device performs a trimming process of extracting only the target object.

(Supplementary Note 22)

The monitoring server described in Supplementary note 20 or 21, wherein when the target object is displayed in a size larger than a predetermined size in the shooting state, the distributed-processing control unit determines that the device performs a feature-value extraction process of extracting a feature value of the target object, or the device transmits image data obtained by compressing the unprocessed image data.

(Supplementary Note 23)

The monitoring server described in any one of Supplementary notes 20 to 22, wherein when only the target object is displayed in the shooting state, the distributed-processing control unit determines that the device performs a feature-value extraction process of extracting a feature value of the target object, converts the unprocessed image data into gray-scale image data, converts the unprocessed image data into binary image data, or performs edge detection.

(Supplementary Note 24)

The monitoring server described in Supplementary note 17 or 18, wherein when the processing load on the device is larger than a second processing load and the second processing load is larger than the first processing load, and when the communication quality is better than a predetermined first communication quality, the distributed-processing control unit determines that the device transmits unprocessed image data and all the processes included in the image analysis process are performed in the monitoring server itself.

(Supplementary Note 25)

The monitoring server described in Supplementary note 24, wherein when the communication quality is better than a second communication quality and the second communication quality is poorer than the first communication quality, and when the processing load on the device is larger than the predetermined first processing load and smaller than the second processing load, and the first processing load is smaller than the second processing load, the distributed-processing control unit determines that the device performs at least one of the plurality of image analysis processes.

(Supplementary Note 26)

The monitoring server described in Supplementary note 25, wherein when the target object is displayed only in a part of an area of the unprocessed image data in the shooting state, the distributed-processing control unit determines that the device performs a feature-value extraction process of extracting a feature value of the target object, or the device performs a trimming process of extracting only the target object.

(Supplementary Note 27)

The monitoring server described in Supplementary note 25 or 26, wherein when the target object is displayed in a size larger than a predetermined size in the shooting state, the distributed-processing control unit determines that the device transmits image data obtained by compressing the unprocessed image data, or the device performs a feature-value extraction process of extracting a feature value of the target object.

(Supplementary Note 28)

The monitoring server described in any one of Supplementary notes 25 to 27, wherein when only the target object is displayed in the shooting state, the distributed-processing control unit determines that the device performs a feature-value extraction process of extracting a feature value of the target object, converts the unprocessed image data into gray-scale image data, converts the unprocessed image data into binary image data, or performs edge detection.

(Supplementary Note 29)

A distributed-processing determination method comprising:

receiving image data acquired by an information processing apparatus; and determining, based on a type of required output of an image analysis process for the image data, a process to be performed in the information processing apparatus and a process to be performed in an own apparatus from among the image analysis process.

(Supplementary Note 30)

The distributed-processing determination method described in Supplementary note 29, comprising:

receiving image data transmitted periodically from a robot, information of communication quality of a communication network between the monitoring server and the robot, and processing-load information of the robot, the robot being the information processing apparatus configured to pursue a tracking target;

determining, when the process is determined, based on at least one of tracking-operation-environment information of the tracking target determined based on the image data, the information on the communication quality, and the processing-load information, a process to be performed in the robot, and the process to be performed in the own device from among the image analysis process including a plurality of processes, the image analysis process being a process of specifying the tracking target; and transmitting information on the process to be performed in the robot to the robot.

(Supplementary Note 31)

The distributed-processing determination method described in Supplementary note 29, comprising:

receiving image data transmitted periodically from a device, information on communication quality of a communication network between the monitoring server and the device, and processing-load information of the device, the device being the information processing apparatus configured to provide an AR service;

determining, when the process is determined, based on at least one of a shooting state of a target object determined based on the image data, the information on the communication quality, and the processing-load information, a process to be performed in the device, and the process to be performed in the monitoring server itself from among the image analysis process including a plurality of processes, the image analysis process being a process of specifying the target object; and transmitting information on the process to be performed in the device to the device.

(Supplementary Note 32)

A program for causing a computer to perform:

receiving image data acquired by an information processing apparatus; and determining, based on a type of required output of an image analysis process for the image data, a process to be performed in the information processing apparatus and a process to be performed in an own apparatus from among the image analysis process.

(Supplementary Note 33)

The program described in Supplementary note 32, wherein the program causes a computer to perform:

receiving image data transmitted periodically from a robot, information of communication quality of a communication network between the monitoring server and the robot, and processing-load information of the robot, the robot being the information processing apparatus configured to pursue a tracking target;

determining, when the process is determined, based on at least one of tracking-operation-environment information of the tracking target determined based on the image data, the information on the communication quality, and the processing-load information, a process to be performed in the robot, and the process to be performed in the own device from among the image analysis process including a plurality of processes, the image analysis process being a process of specifying the tracking target; and transmitting information on the process to be performed in the robot to the robot.

(Supplementary Note 34)

The program described in Supplementary note 32, wherein the program causes a computer to perform:

receiving image data transmitted periodically from a device, information on communication quality of a communication network between the monitoring server and the device, and processing-load information of the device, the device being the information processing apparatus configured to provide an AR service;

determining, when the process is determined, based on at least one of a shooting state of a target object determined based on the image data, the information on the communication quality, and the processing-load information, a process to be performed in the device, and the process to be performed in the monitoring server itself from among the image analysis process including a plurality of processes, the image analysis process being a process of specifying the target object; and

REFERENCE SIGNS LIST

10 MONITORING SERVER
11 COMMUNICATION UNIT
12 DISTRIBUTED-PROCESSING CONTROL UNIT
20 ROBOT
30 TRACKING TARGET
40 MONITORING SERVER
41 COMMUNICATION UNIT
42 DISTRIBUTED-PROCESSING CONTROL UNIT
43 IMAGE ANALYSIS UNIT
44 OPERATION DETERMINATION UNIT
50 ROBOT
51 COMMUNICATION UNIT
52 DISTRIBUTED-PROCESSING CONTROL UNIT
53 SENSOR INFORMATION ACQUISITION UNIT
54 IMAGE ANALYSIS UNIT
55 OPERATION DETERMINATION UNIT
56 ROBOT CONTROL UNIT
60 SMALL-SIZED DEVICE
61 COMMUNICATION UNIT
62 DISTRIBUTED-PROCESSING CONTROL UNIT
63 SENSOR INFORMATION ACQUISITION UNIT
64 IMAGE ANALYSIS UNIT
65 OPERATION DETERMINATION UNIT
66 IMAGE DISPLAY CONTROL UNIT

What is claimed is:

1. A monitoring server comprising:
at least one memory storing instructions, and
at least one processor configured to execute the instructions to;
receive image data acquired by an information processing apparatus; and
determine, based on a type of required output of an image analysis process for the image data, a process to be performed in the information processing apparatus and a process to be performed in the monitoring server itself from among the image analysis process, wherein
the at least one processor is further configured to execute the instructions to receive at least one of information on communication quality of a communication network between the monitoring server and the information processing apparatus, and processing-load information of the information processing apparatus, and
determine, based on at least one of the content of the image analysis process, the information on the communication quality, and the processing-load information, the process to be performed in the information processing apparatus, and the process to be performed in the monitoring server itself from among the information analysis process.

2. The monitoring server according to claim 1, wherein the at least one processor is further configured to execute the instructions to determine a content of the image analysis process based on the type of the output of the image analysis process.

3. The monitoring server according to claim 1, wherein the at least one processor is further configured to execute the instructions to determine the type of the output of the image analysis process based on information on an execution status of an application based on the image data.

4. The monitoring server according to claim 1, wherein the at least one processor is further configured to execute the instructions to receive image data transmitted periodically from a robot, information on communication quality of a communication network between the monitoring server and the robot, and processing-load information on the robot, the robot being the information processing apparatus configured to pursue a tracking target,
determine, based on at least one of tracking-operation-environment information of the tracking target determined based on the image data, the information on the communication quality, and the processing-load information, a process to be performed in the robot, and the process to be performed in the monitoring server itself from among the image analysis process including a plurality of processes, the image analysis process being a process of specifying the tracking target, and
transmit information on the process to be performed in the robot to the robot.

5. The monitoring server according to claim 4, wherein when a processing load on the robot is smaller than a predetermined first processing load, the at least one processor is further configured to execute the instructions to determine that all the processes included in the image analysis process are performed in the robot irrespective of the tracking-operation-environment information and the information on the communication quality.

6. The monitoring server according to claim 5, wherein when the processing load on the robot is larger than a predetermined second processing load and the second processing load is larger than the first processing load, and when the communication quality is better than a predetermined first communication quality, the at least one processor is further configured to execute the instructions to determine that the robot transmits unprocessed image data and all the processes included in the image analysis process are performed in the monitoring server itself.

7. The monitoring server according to claim 6, wherein when the communication quality is better than a second communication quality and the second communication quality is poorer than the first communication quality, and when the processing load on the robot is larger than the predetermined first processing load and smaller than the second processing load, and the first processing load is smaller than the second processing load,
the at least one processor is further configured to execute the instructions to determine whether the robot transmits image data obtained by compressing the unprocessed image data, or the robot performs a feature-value extraction process of extracting a feature value of the tracking target, the feature-value extraction process being included in the image analysis process.

8. The monitoring server according to claim 7, wherein when the tracking-operation-environment information does not contain a moving object other than the tracking target, the at least one processor is further configured to execute the instructions to determine that the robot performs the feature-value extraction process of extracting the feature value of the tracking target included in the image analysis process.

9. The monitoring server according to claim 7, wherein when the tracking-operation-environment information contains a moving object other than the tracking target, the at least one processor is further configured to execute the instructions to determine that the robot transmits the image data obtained by compressing the unprocessed image data.

10. The monitoring server according to claim 4, wherein when the processing load on the robot is larger than the predetermined first processing load and the communication quality is better than a predetermined first communication quality, the at least one processor is further configured to execute the instructions to determine that the robot transmits unprocessed image data and all the processes included in the image analysis process are performed in the monitoring server itself.

11. The monitoring server according to claim 10, wherein when the communication quality is poorer than the predetermined first communication quality and better than a second communication quality, and the first communication quality is better than the second communication quality, and when the processing load on the robot is larger than the predetermined first processing load and smaller than a second processing load, and the first processing load is smaller than the second processing load,
the at least one processor is further configured to execute the instructions to determine whether the robot transmits image data obtained by compressing the unprocessed image data, or the robot performs a feature-value extraction process of extracting a feature value of the tracking target, the feature-value extraction process being included in the image analysis process.

12. The monitoring server according to claim 11, wherein when the tracking-operation-environment information does not contain a moving object other than the tracking target, the at least one processor is further configured to execute the instructions to determine that the robot performs the feature-value extraction process of extracting the feature value of the tracking target included in the image analysis process.

13. The monitoring server according to claim 11, wherein when the tracking-operation-environment information contains a moving object other than the tracking target, the at least one processor is further configured to execute the instructions to determine that the robot transmits the image data obtained by compressing the unprocessed image data.

14. The monitoring server according to claim 4, wherein the image analysis process comprises a feature-value extraction process of extracting the feature value of the tracking target, an object recognition process of recognizing an object corresponding to the tracking target, and an object specifying process of specifying the tracking target.

15. A distributed-processing determination method comprising:
receiving image data acquired by an information processing apparatus;
determining, based on a type of required output of an image analysis process for the image data, a process to be performed in the information processing apparatus and a process to be performed in an own apparatus from among the image analysis process;
receiving image data transmitted periodically from a device, information on communication quality of a communication network between the monitoring server and the device, and processing-load information of the device, the device being the information processing apparatus configured to provide an AR service;
determining, when the process is determined, based on at least one of a shooting state of a target object determined based on the image data, the information on the communication quality, and the processing-load information, a process to be performed in the device, and the process to be performed in the monitoring server itself from among the image analysis process including a plurality of processes, the image analysis process being a process of specifying the target object; and
transmitting information on the process to be performed in the device to the device.

16. The distributed-processing determination method according to claim 15, comprising:
receiving image data transmitted periodically from a robot, information of communication quality of a communication network between the monitoring server and the robot, and processing-load information of the robot, the robot being the information processing apparatus configured to pursue a tracking target;
determining, when the process is determined, based on at least one of tracking-operation-environment information of the tracking target determined based on the image data, the information on the communication quality, and the processing-load information, a process to be performed in the robot, and the process to be performed in the own device from among the image analysis process including a plurality of processes, the image analysis process being a process of specifying the tracking target; and
transmitting information on the process to be performed in the robot to the robot.

17. A non-transitory computer readable medium storing a program for causing a computer to perform:
receiving image data acquired by an information processing apparatus;
determining, based on a type of required output of an image analysis process for the image data, a process to be performed in the information processing apparatus and a process to be performed in an own apparatus from among the image analysis process;
receiving image data transmitted periodically from a device, information on communication quality of a communication network between the monitoring server and the device, and processing-load information of the device, the device being the information processing apparatus configured to provide an AR service;
determining, when the process is determined, based on at least one of a shooting state of a target object determined based on the image data, the information on the communication quality, and the processing-load information, a process to be performed in the device, and the process to be performed in the monitoring server itself from among the image analysis process including a plurality of processes, the image analysis process being a process of specifying the target object; and
transmitting information on the process to be performed in the device to the device.

* * * * *